US010663027B2

(12) United States Patent
Patel et al.

(10) Patent No.: US 10,663,027 B2
(45) Date of Patent: May 26, 2020

(54) DAMPER WITH VALVE PRELOAD LIMITER

(71) Applicant: Tenneco Automotive Operating Company Inc., Lake Forest, IL (US)

(72) Inventors: Prashant Patel, Canton, MI (US); Koenraad Reybrouck, Etterbeek (BE); Justin Hendrix, LaSalle, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 67 days.

(21) Appl. No.: 15/933,951

(22) Filed: Mar. 23, 2018

(65) Prior Publication Data
US 2019/0293146 A1 Sep. 26, 2019

(51) Int. Cl.
*F16F 9/512* (2006.01)
*F16F 9/18* (2006.01)
(Continued)

(52) U.S. Cl.
CPC ............ *F16F 9/5126* (2013.01); *F16F 9/182* (2013.01); *F16F 9/185* (2013.01); *F16F 9/3214* (2013.01); *F16F 9/34* (2013.01)

(58) Field of Classification Search
CPC .......... B60G 17/0152; B60G 2400/204; B60G 2500/10; F16F 9/22; F16F 9/348;
(Continued)

(56) References Cited

U.S. PATENT DOCUMENTS 5,018,608 A  5/1991  Imaizumi
5,248,014 A  9/1993  Ashiba
(Continued)

FOREIGN PATENT DOCUMENTS

JP  2002013579 A  1/2002
JP  2017026040 A  2/2017
(Continued)

OTHER PUBLICATIONS

International Search Report issued in related PCT/US2019/022247 dated Jun. 26, 2019.
(Continued)

*Primary Examiner* — Robert A. Siconolfi
*Assistant Examiner* — San M Aung
(74) *Attorney, Agent, or Firm* — Harness Dickey & Pierce

(57) ABSTRACT

A damper system for a vehicle is provided that includes including a pressure tube, a piston rod, and a piston assembly that is mounted to the piston rod and separates the pressure tube into first and second working chambers. A valve assembly, mounted to the piston assembly, controls fluid flow between the first and second working chambers. A frequency dependent damper assembly, coupled to the piston rod at a position below the piston assembly, includes a plunger sleeve that is longitudinally moveable to transmit an adaptive force to a valve assembly. A plunger travel limiter, positioned longitudinally between the frequency dependent damper assembly and the valve assembly, contacts the plunger sleeve and prevents the plunger sleeve from moving further towards the piston assembly to limit the magnitude of the adaptive force applied to the valve assembly.

19 Claims, 13 Drawing Sheets

(51) Int. Cl.
*F16F 9/34* (2006.01)
*F16F 9/32* (2006.01)

(58) Field of Classification Search
CPC .......... F16F 9/3214; F16F 9/468; F16F 9/504; F16F 9/512; F16F 9/516
USPC ....... 188/275, 314, 322.15, 313, 280, 282.1, 188/266.4, 282.6, 320
See application file for complete search history.

(56) References Cited

U.S. PATENT DOCUMENTS

| | | | |
|---|---|---|---|
| 5,409,090 A * | 4/1995 | Kashiwagi | F16F 9/468 188/266.4 |
| 5,497,862 A | 3/1996 | Hoya | |
| 6,220,409 B1 | 4/2001 | Deferme | |
| 6,474,454 B2 | 11/2002 | Matsumoto et al. | |
| 8,584,818 B2 | 11/2013 | Murakami | |
| 8,794,403 B2 | 8/2014 | Chikamatsu | |
| 9,239,092 B2 | 1/2016 | Nowaczyk et al. | |
| 9,291,231 B2 | 3/2016 | Kim et al. | |
| 2005/0045440 A1 | 3/2005 | Kock et al. | |
| 2009/0084647 A1 | 4/2009 | Maneyama et al. | |
| 2011/0056783 A1 * | 3/2011 | Teraoka | F16F 9/5126 188/313 |
| 2013/0048451 A1 * | 2/2013 | Yamashita | F16F 9/50 188/280 |
| 2015/0053518 A1 | 2/2015 | Nowaczyk et al. | |
| 2015/0354660 A1 * | 12/2015 | Komatsu | F16F 9/5126 188/280 |
| 2019/0195308 A1 * | 6/2019 | Forster | F16F 9/3485 |

FOREIGN PATENT DOCUMENTS

| | | |
|---|---|---|
| KR | 10-2017-0018357 A | 2/2017 |
| KR | 10-2018-0021109 A | 2/2018 |
| WO | 2018-046193 A1 | 3/2018 |

OTHER PUBLICATIONS

Written Opinion issued in related PCT/US2019/022247 dated Jun. 26, 2019.

* cited by examiner

DAMPER WITH VALVE PRELOAD LIMITER

FIELD

The present disclosure relates to automotive shock absorbers/dampers. More particularly, the present disclosure relates to shock absorbers/dampers that provide a different magnitude of damping based on a frequency as well as a velocity of an input to the shock absorber/damper.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

The most common type of shock absorbers for automobiles are mono-tube and dual-tube shock absorbers. In the mono-tube shock absorber, a piston is located within a fluid chamber defined by a pressure tube and is connected to the sprung mass of the vehicle through a piston rod. The pressure tube is connected to the unsprung mass of the vehicle. The piston divides the fluid chamber of the pressure tube into an upper working chamber and a lower working chamber. The piston includes compression valving that limits the flow of hydraulic fluid from the lower working chamber to the upper working chamber during a compression stroke. The piston also includes rebound valving that limits the flow of hydraulic fluid from the upper working chamber to the lower working chamber during a rebound or extension stroke. Because the compression valving and the rebound valving have the ability to limit the flow of hydraulic fluid, the shock absorber is able to produce a damping force that counteracts oscillations/vibrations, which would otherwise be transmitted from the unsprung mass to the sprung mass.

In a dual-tube shock absorber, a fluid reservoir is defined between the pressure tube and a reservoir tube that is positioned around the pressure tube. A base valve assembly is located between the lower working chamber and the fluid reservoir to control the flow of dampening fluid between the lower working chamber and the fluid reservoir. The compression valving of the piston is moved to the base valve assembly and is replaced in the piston by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction and these check valves can be designed such that they also generate a damping force.

Together, the compression and rebound valving and/or the check valve assemblies for the shock absorber have the function of controlling fluid flow between the upper and lower working chambers of the shock absorber. By controlling the fluid flow between the two working chambers, a pressure drop is built up between the two working chambers and this contributes to the damping forces of the shock absorber. The compression and rebound valving and the check valve assemblies can be used to tune the damping forces to control ride and handling as well as noise, vibration, and harshness.

Typical passive shock absorbers provide the same magnitude of damping force regardless of the frequency of the input. For a given input velocity, the damping force generated by a conventional passive shock absorber remains the same regardless of the frequency of the input. Typically, the primary ride frequency of a passenger vehicle is in the range of 1 to 2 Hertz. When a vehicle goes over a road surface with a lower frequency input, a higher amount of damping is preferred to manage the road inputs. During handling events (where directional stability is critical), a higher amount of damping is also preferred. For example, the vehicle may be subjected to body roll during handling events. The frequency of body roll in a typical passenger vehicle commonly ranges from 2 to 4 Hertz depending on the roll-stiffness and the height of the center of gravity of the vehicle. While there are active and semi-active damper systems that change the damping of the shock absorber in real-time to address different vehicle suspension inputs, a need exists for a passive shock absorber that provides frequency dependent damping without complicated and expansive active or semi-active damper control systems.

SUMMARY

This section provides a general summary of the disclosure, and is not a comprehensive disclosure of its full scope or all of its features.

In accordance with one aspect of the subject disclosure, a damper system for a vehicle is provided. The damper system includes a pressure tube and a piston assembly that is slidably fitted in the pressure tube. A piston rod extends within the pressure tube along a longitudinal axis and the piston assembly is coupled to the piston rod. The pressure tube contains a hydraulic fluid and the piston assembly separates the pressure tube into a first working chamber and a second working chamber. The piston assembly includes a piston body and a valve assembly. The valve assembly operates to control flow of the hydraulic fluid between the first working chamber and the second working chamber.

The damper system also includes a frequency dependent damper assembly. The frequency dependent damper assembly includes a damper housing and a plunger sleeve. The damper housing is coupled to the piston rod. The plunger sleeve is longitudinally moveable relative to the damper housing along the longitudinal axis between a rest position and an engaged position. A plunger chamber is provided between the damper housing and the plunger sleeve. The plunger chamber is fluidly connected to at least one of the first working chamber and the second working chamber. In operation, an increase in pressure within the plunger chamber creates an adaptive force on the plunger sleeve that moves the plunger sleeve longitudinally towards the piston assembly to the engaged position. The plunger sleeve contacts the valve assembly in the engaged position and transmits the adaptive force to the valve assembly. This in turn increases the resistance of the valve assembly to opening, therefore increasing the damping provided by the valve assembly.

The damper system further comprises a plunger travel limiter that is positioned longitudinally between the damper housing and the valve assembly. The plunger sleeve contacts the plunger travel limiter when the plunger sleeve is in the engaged position. Accordingly, the plunger travel limiter operates to restrict the longitudinal movement of the plunger sleeve and prevents the plunger sleeve from moving further towards the piston body when the plunger sleeve is in the engaged position. The plunger travel limiter therefore limits the adaptive force the plunger sleeve applies to the valve assembly. Advantageously, the plunger travel limiter prevents the plunger sleeve from exerting an excessive force to the valve assembly. The application of excessive force to the valve assembly is detrimental because it can cause a lock-up condition where the valve assembly does not open when it should. The excessive force can also cause permanent deformation of the valve assembly, which affects the operation of the valve assembly. The plunger travel limiter eliminates the potential for lock-up of the valve assembly and improves the overall durability of the frequency dependent damper assembly.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
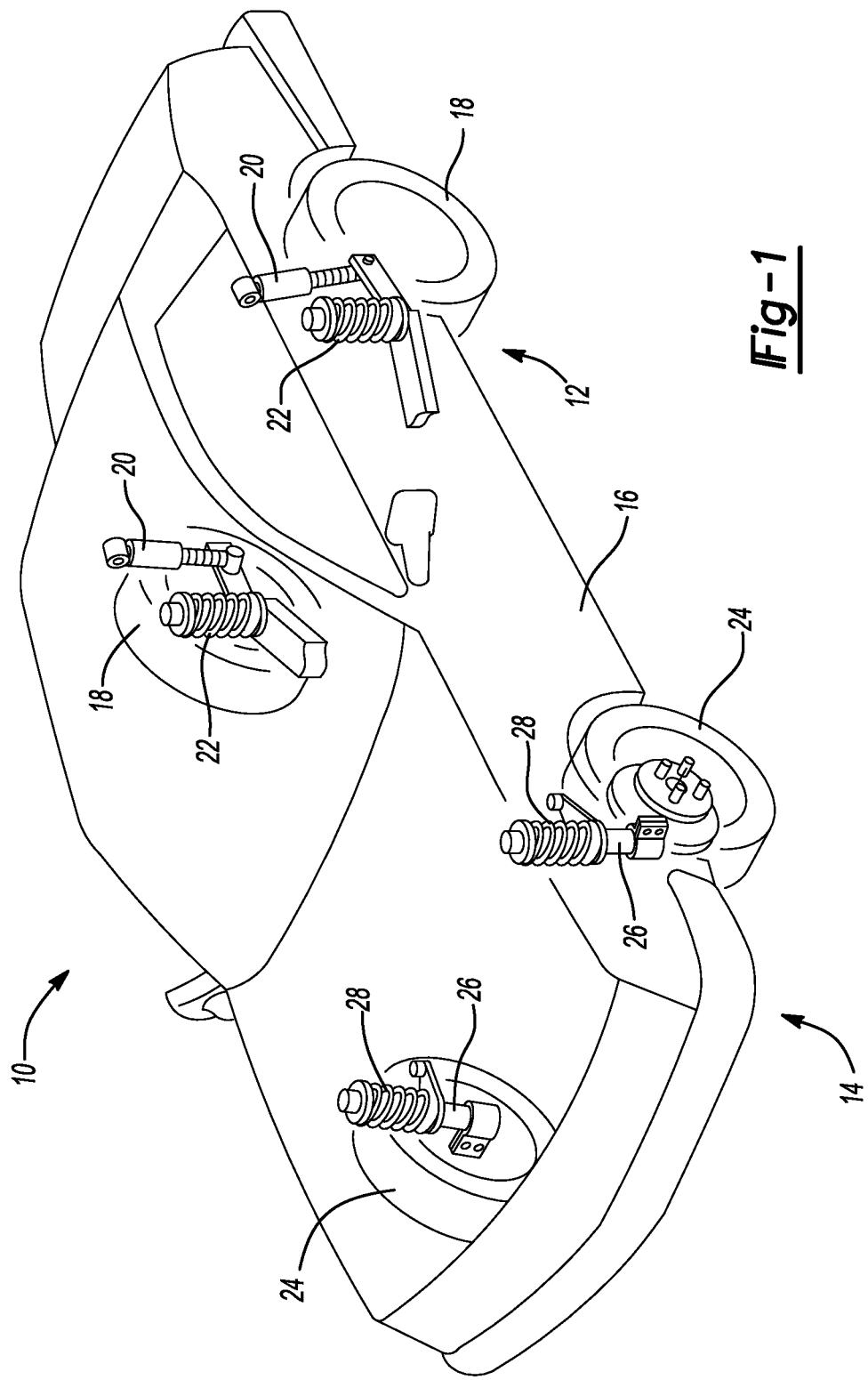
FIG. 1 is an illustration of an exemplary vehicle equipped with a shock absorber in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a vehicle 10 including a rear suspension 12, a front suspension 14, and a body 16 is illustrated. Rear suspension 12 has a transversely extending rear axle assembly (not shown) adapted to operatively support the vehicle's rear wheels 18. The rear axle assembly is operatively connected to body 16 by a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by a second pair of shock absorbers 26 and by a pair of helical coil springs 28. Shock absorbers 20 and 26 serve to dampen the relative motion of the unsprung portion (i.e., front and rear suspensions 14 and 12, respectively) and the sprung portion (i.e., body 16) of vehicle 10. While the vehicle 10 has been depicted as a passenger car having front and rear axle assemblies, shock absorbers 20 and 26 may be used with other types of vehicles or machinery, or in other types of applications such as vehicles incorporating independent front and/or independent rear suspension systems. Further, the term "shock absorber" as used herein is meant to refer to shock absorber and shock absorber systems in general and thus will include MacPherson struts. It should also be appreciated that the scope of the subject disclosure is intended to include shock absorber systems for stand-alone shock absorbers 20 and coil-over shock absorbers 26.

Figure 2:
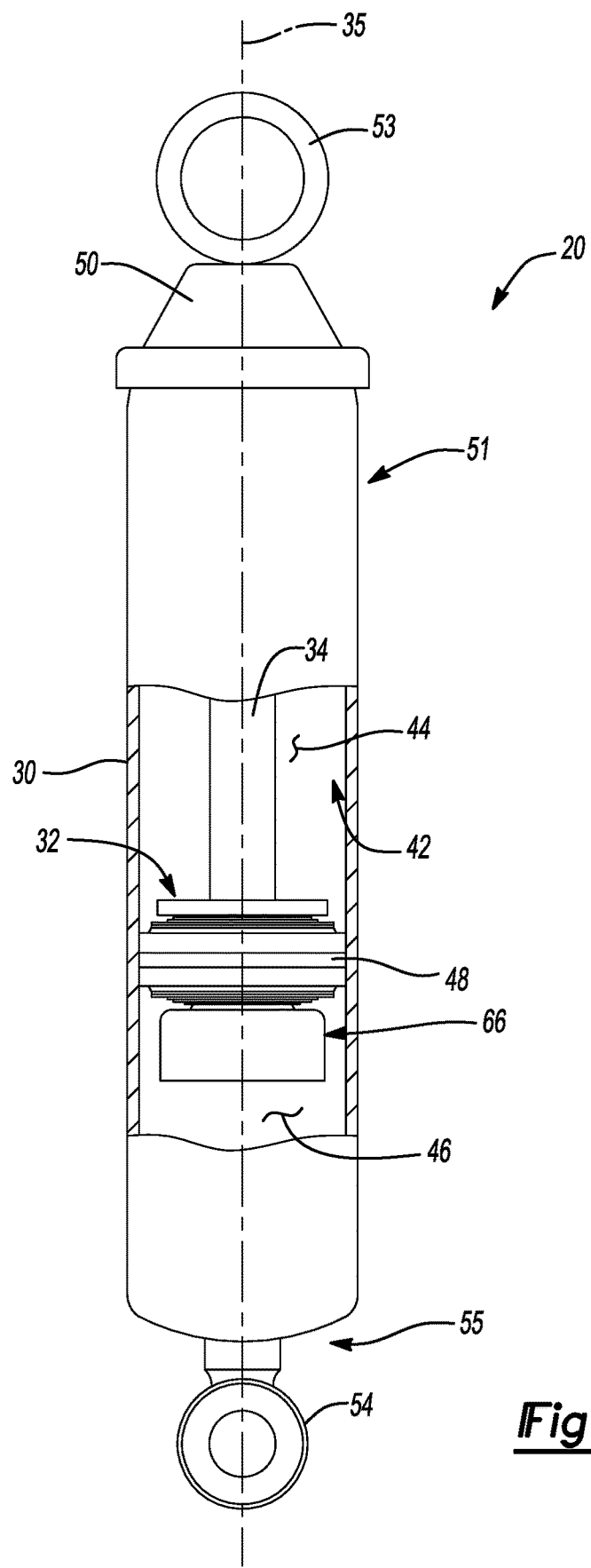
FIG. 2 is a fragmentary side view of a shock absorber constructed in accordance with the teachings of the present disclosure.

With additional reference to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10 and the mounting location of the coil spring 28 relative to the shock absorber 26.

Shock absorber 20 comprises a pressure tube 30, a piston assembly 32, and a piston rod 34. The pressure tube 30 and the piston rod 34 extend co-axially along a longitudinal axis 35. Pressure tube 30 defines an internal cavity 42. Piston assembly 32 is slidably disposed within the internal cavity 42 of the pressure tube 30 and divides the internal cavity 42 into a first working chamber 44 and a second working chamber 46. A seal 48 is disposed between piston assembly 32 and pressure tube 30 to permit sliding movement of piston assembly 32 with respect to pressure tube 30 without generating undue frictional forces as well as sealing the first working chamber 44 from the second working chamber 46.

Piston rod 34 is attached to piston assembly 32 and extends through the first working chamber 44 and through an upper end cap 50 which closes a first end 51 of pressure tube 30. An attachment end 53 of piston rod 34 opposite to piston assembly 32 is connected to the body 16 of the vehicle 10 (i.e., the sprung portion of vehicle 10). Pressure tube 30 is filled with a hydraulic fluid and includes an attachment fitting 54 at a second end 55 of the pressure tube 30 that is connected to the unsprung portion of the suspension 12 and 14. The first working chamber 44 is thus positioned between the first end 51 of the pressure tube 30 and the piston assembly 32 and the second working chamber 46 is positioned between the second end 55 of the pressure tube 30 and the piston assembly 32. Suspension movements of the vehicle 10 will cause extension/rebound or compression movements of piston assembly 32 with respect to pressure tube 30. Valving within piston assembly 32 controls the movement of hydraulic fluid between the first working chamber 44 and the second working chamber 46 during movement of piston assembly 32 within pressure tube 30. It should be appreciated that the shock absorber 20 may be installed in a reverse orientation, where the attachment end 53 of the piston rod 34 is connected to the unsprung portion of the suspension 12 and 14 and the attachment fitting 54 is connected to the body 16 (i.e., the sprung portion of vehicle 10).

Figure 3:
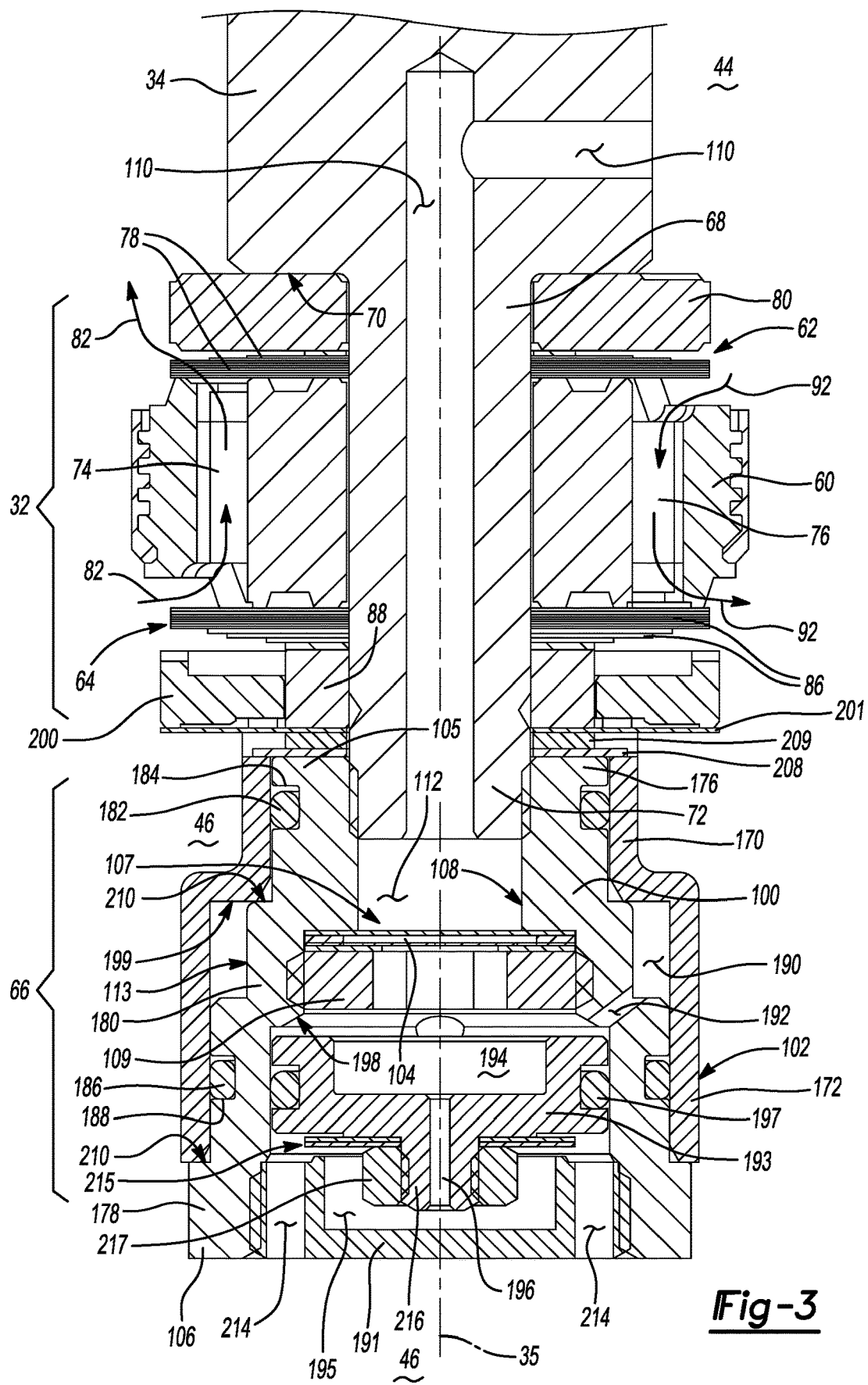
FIG. 3 is a fragmentary cross-sectional view of a shock absorber constructed in accordance with the teachings of the present disclosure.
Figure 4:
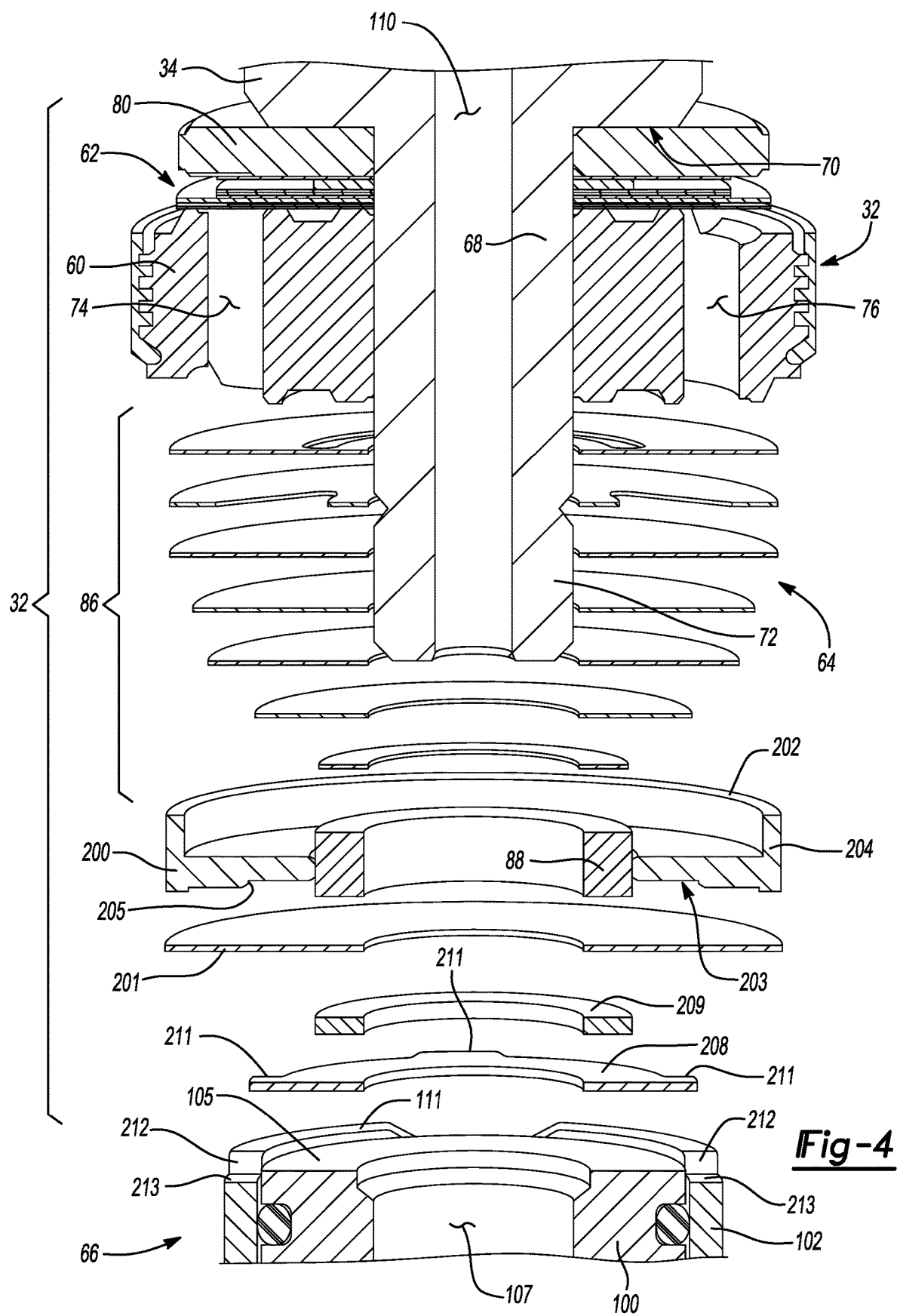
FIG. 4 is an exploded perspective view depicting a piston assembly, rebound disk stack, floating support washer, disk spring, plunger travel limiter, and plunger sleeve of the shock absorber illustrated in FIG. 3.

With additional reference to FIGS. 3 and 4, piston assembly 32 comprises a piston body 60 that is attached to piston rod 34, a compression valve assembly 62, a rebound valve assembly 64, and a frequency dependent damper assembly 66. Piston rod 34 includes a reduced diameter section 68 located on the end of piston rod 34 that is disposed within pressure tube 30 such that the reduced diameter section 68 forms a shoulder 70 that abuts the piston assembly 32. Piston body 60 is located on reduced diameter section 68 with compression valve assembly 62 being located longitudinally between piston body 60 and shoulder 70 and with rebound valve assembly 64 being located longitudinally between piston body 60 and a threaded end 72 of piston rod 34. Piston body 60 defines a plurality of compression flow passages 74 and a plurality of rebound flow passages 76. The compression valve assembly 62 operates to control fluid flow of the hydraulic fluid through the plurality of compression flow passages 74 in the piston body 60 and the rebound valve assembly 64 operates to control fluid flow of the hydraulic fluid through the plurality of rebound flow passages 76 in the piston body 60. Therefore, both the compression valve assembly 62 and the rebound valve assembly 64 control fluid flow between the first and second working chambers 44, 46 and thus cooperate to form a first valve assembly.

Compression valve assembly 62 comprises a plurality of compression valve plates 78 and a valve stop 80. The compression valve plates 78 are disposed adjacent to piston body 60 to cover the plurality of compression flow passages 74. During a compression stroke of shock absorber 20, fluid pressure builds up in the second working chamber 46 until the fluid pressure applied to the compression valve plates 78, through the plurality of compression flow passages 74, overcomes the load required to deflect the plurality of compression valve plates 78. The compression valve plates 78 elastically deflect to open the compression flow passages 74 and allow the hydraulic fluid to flow from the second working chamber 46 to the first working chamber 44 as shown by arrows 82 in FIG. 3. Valve stop 80 is disposed between the compression valve plates 78 and the shoulder 70 to limit the deflection of the compression valve plates 78.

Rebound valve assembly 64 comprises a plurality of rebound valve plates 86. The rebound valve plates 86 are disposed adjacent to piston body 60 to cover the plurality of rebound flow passages 76 to close the plurality of rebound flow passages 76. The frequency dependent damper assembly 66 is threaded onto threaded end 72 of piston rod 34. A sleeve 88 is positioned longitudinally between the frequency dependent damper assembly 66 and the plurality of rebound valve plates 86. The sleeve 88 extends annularly about the reduced diameter section 68 of the piston rod 34. Therefore, the plurality of rebound valve plates 86 are clamped between the sleeve 88 and the piston body 60 when the frequency dependent damper assembly 66 is threaded onto the threaded end 72 of the piston rod 34. During an extension or rebound stroke of the shock absorber 20, fluid pressure builds up in the first working chamber 44 until the fluid pressure applied to the rebound valve plates 86, through the rebound flow passages 76, overcomes the load required to deflect rebound valve plates 86. The plurality of rebound valve plates 86 elastically deflect thereby opening the rebound flow passages 76 to allow the hydraulic fluid to flow from the first working chamber 44 to the second working chamber 46 as shown by arrows 92 in FIG. 3.

The entire frequency dependent damper assembly 66 translates longitudinally along the longitudinal axis during rebound/extension and compression movements of the piston rod 34 because the frequency dependent damper assembly 66 is fixed to piston rod 34. Although the frequency dependent damper assembly 66 is rigidly connected with the piston assembly 32, the frequency dependent damper assembly 66 is spaced radially inward of and therefore does not seal against the pressure tube 30.

The frequency dependent damper assembly 66 comprises a damper housing 100, a plunger sleeve 102, and a check valve 104. The damper housing 100 includes a first end 105 that is threaded onto the threaded end 72 of the piston rod 34, a second end 106 opposite the first end 105, and a damper cavity 107 that extends through the damper housing 100 from the first end 105 to the second end 106. The damper cavity 107 is thus defined by an inside face 108 of the damper housing 100. The check valve 104 is disposed within the damper cavity 107 adjacent to the first end 105 and is held in place by a check valve support 109 that threads into the inside face 108 of the damper housing 100. Alternatively, the check valve support 109 may be held in the damper housing 100 by a crimp or stake. The plunger sleeve 102 includes a first end 111 that is positioned adjacent to the first end 105 of the damper housing 100.

A flow passage 110 extending through the piston rod 34 is disposed in fluid communication with the first working chamber 44 and a staging chamber 112 located in the damper cavity 107 adjacent to the first end 105 of the damper housing 100. Staging chamber 112 is partially defined by damper housing 100 and check valve 104. Plunger sleeve 102 is a substantially tubular member that extends about an outside face 113 of the damper housing 100 and includes a reduced diameter portion 170 and an enlarged diameter portion 172. The outside face 113 of the valve housing 100 includes a similarly stepped structure with a reduced diameter portion 176, an enlarged diameter portion 178 and an intermediate diameter portion 180 positioned longitudinally between the reduced diameter portion 176 and the enlarged diameter portion 178. A first seal 182 is positioned within a groove 184 of valve housing 100. A second seal 186 is positioned within a second groove 188 of valve housing 100. Based on the longitudinal position of the first seal 182, second seal 186 and intermediate portion 180, a plunger chamber 190 is provided between the outside face 113 of the damper housing 100 and the plunger sleeve 102. Aperture 192 extends through the damper housing 100 between the damper cavity 107 and the plunger chamber 190.

Figure 10A:
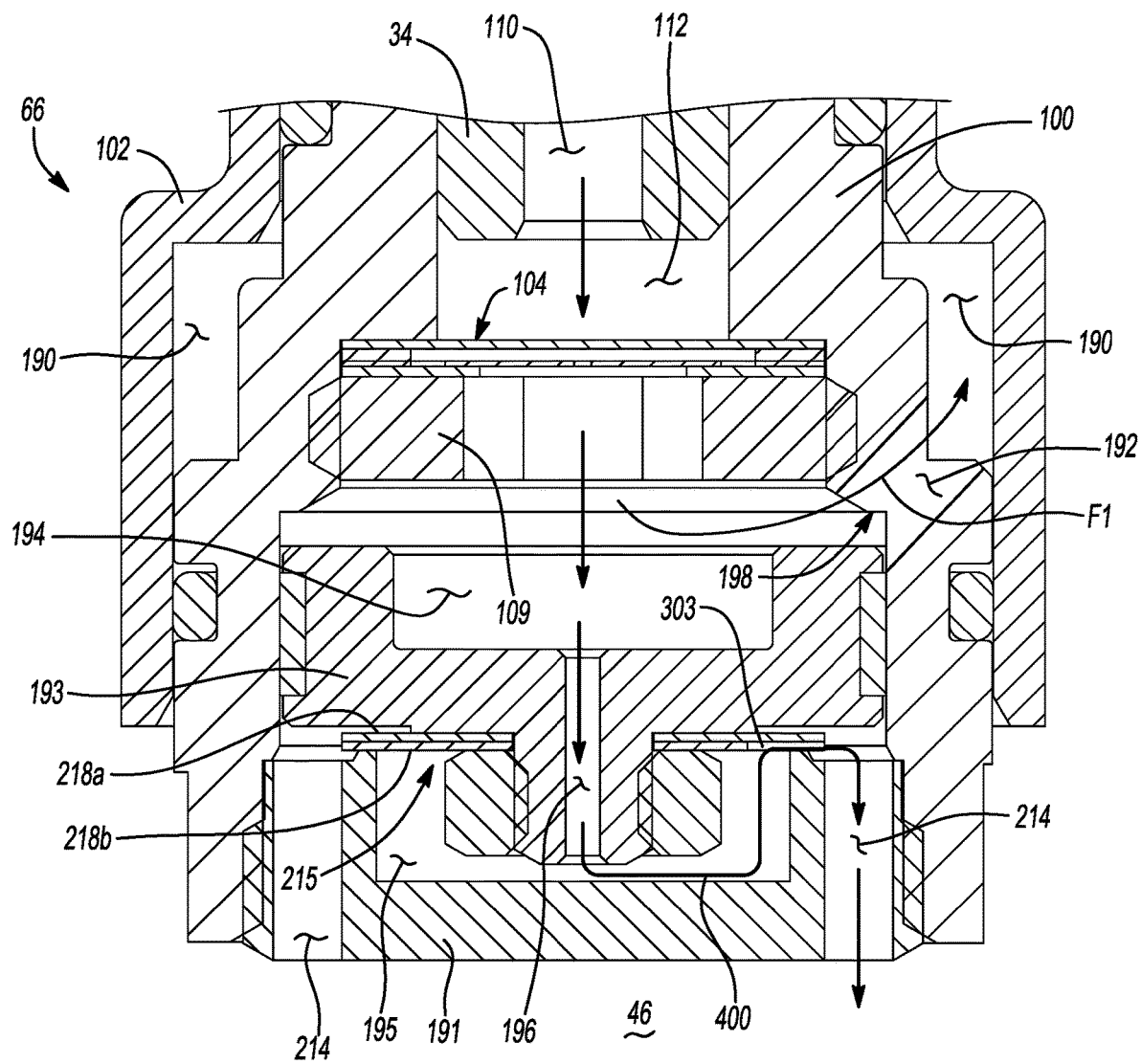
FIG. 10A is a fragmentary cross-sectional view of the shock absorber illustrated in FIG. 3 depicting a floating piston of the frequency dependent damper assembly in a seated position during a rebound stroke.
Figure 10B:
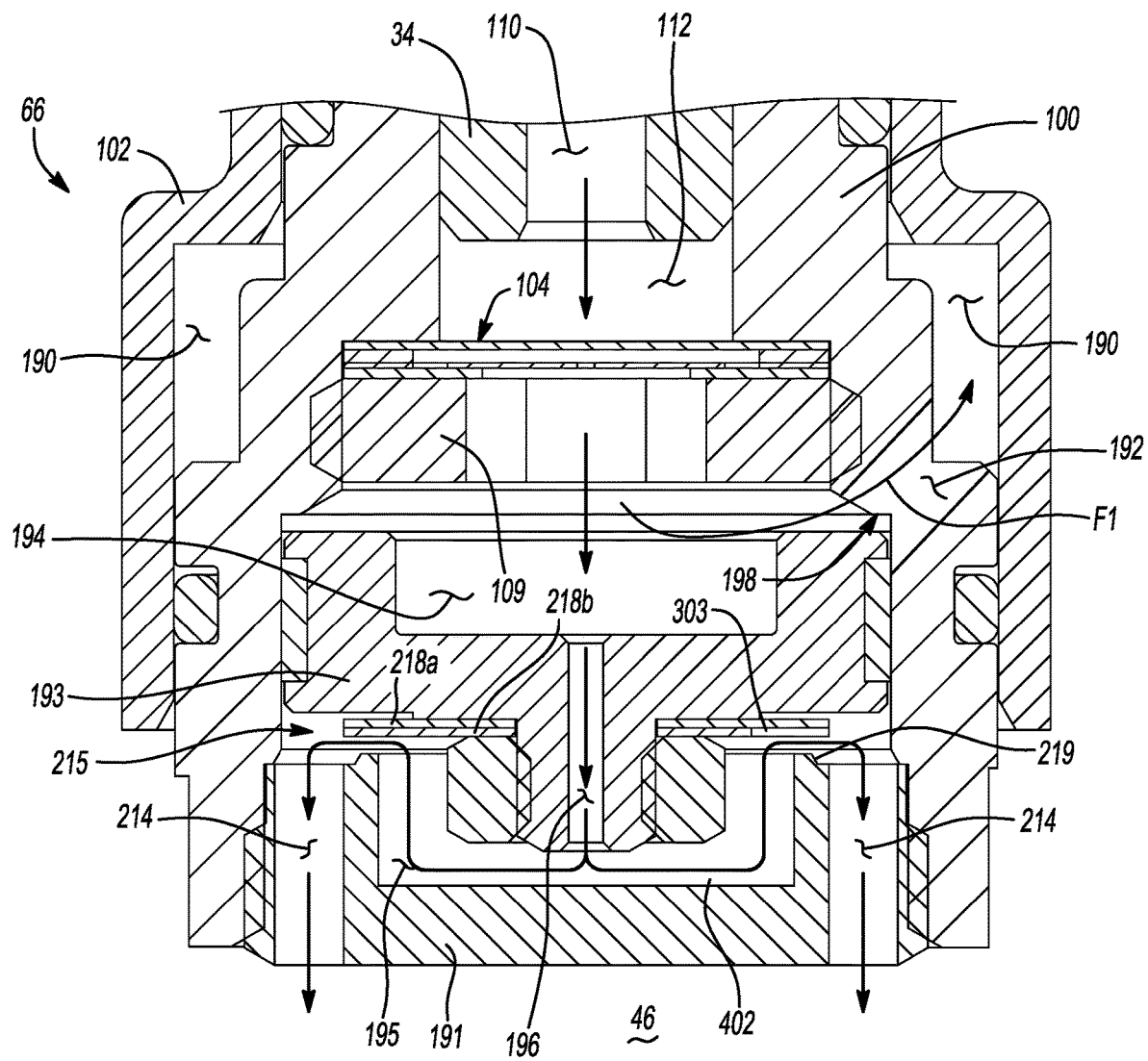
FIG. 10B is a fragmentary cross-sectional view of the shock absorber illustrated in FIG. 3 depicting the floating piston of the frequency dependent damper assembly in an unseated position during a rebound stroke.

An end plate 191 is positioned in the damper cavity 107 and is secured to the second end 106 of the damper housing 100. A floating piston 193 is housed within the damper cavity 107 and is longitudinally displaceable relative to the valve housing 100 along the longitudinal axis 35 between a seated position (FIG. 10A) and an unseated position (FIG. 10B). First and second accumulation chambers 194, 195 are disposed within the damper cavity 107, which are separated by the floating piston 193. The first accumulation chamber 194 is positioned longitudinally between the floating piston 193 and the check valve 104 and the second accumulation chamber 195 is positioned longitudinally between the floating piston 193 and the end plate 191. The first accumulation chamber 194 is arranged in fluid communication with the second accumulation chamber 195 via a bleed channel 196 that extends through the floating piston 193. The size of the bleed channel 196 can be modified to change the dampening characteristics of the frequency dependent damper assembly 66. By way of example and without limitation, the bleed channel 196 in the floating piston 193 may have a cross-sectional area that limits a volumetric flow rate of the fluid flowing between the first and second accumulation chambers 194, 195 to provide reduced dampening when the movement of the piston rod 34 is at a frequency above 6 Hertz (Hz) and a velocity below 0.02 meters per second (m/s). In accordance with this example, the cross-sectional area of the bleed channel 196 may range from 0.1 to 3.0 square millimeters (mm$^2$).

The floating piston 193 carries a seal 197 that prevents fluid from passing between the floating piston 193 and the inside face 108 of the damper housing 100. The amount of axial travel that floating piston 193 may experience may be varied based on the placement of a stop 198 formed on the damper housing 100 as well as the relative position of the end plate 191. By varying the longitudinal position of these components, the total maximum volume of first and second accumulation chambers 194, 195 can be varied to effect low frequency delay.

Figure 5:
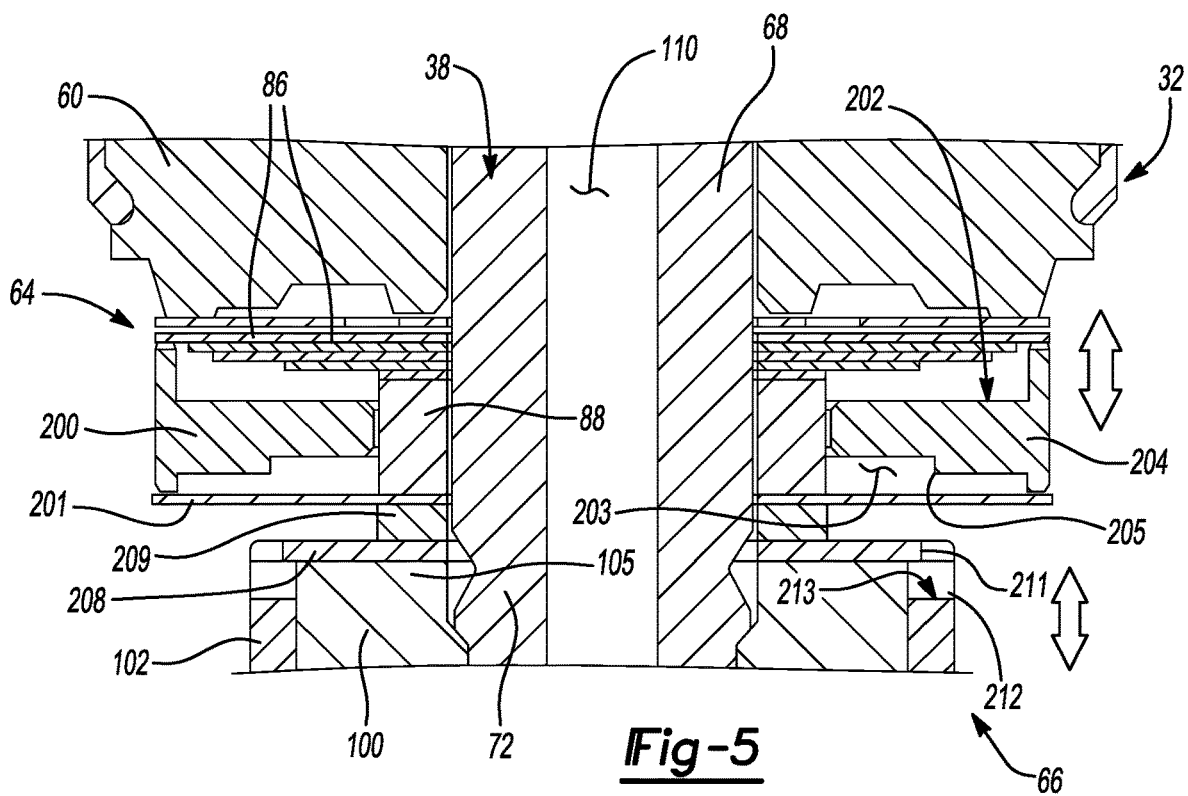
FIG. 5 is a fragmentary cross-sectional view of the shock absorber illustrated in FIG. 3 depicting the plunger sleeve in a rest position.
Figure 6A:
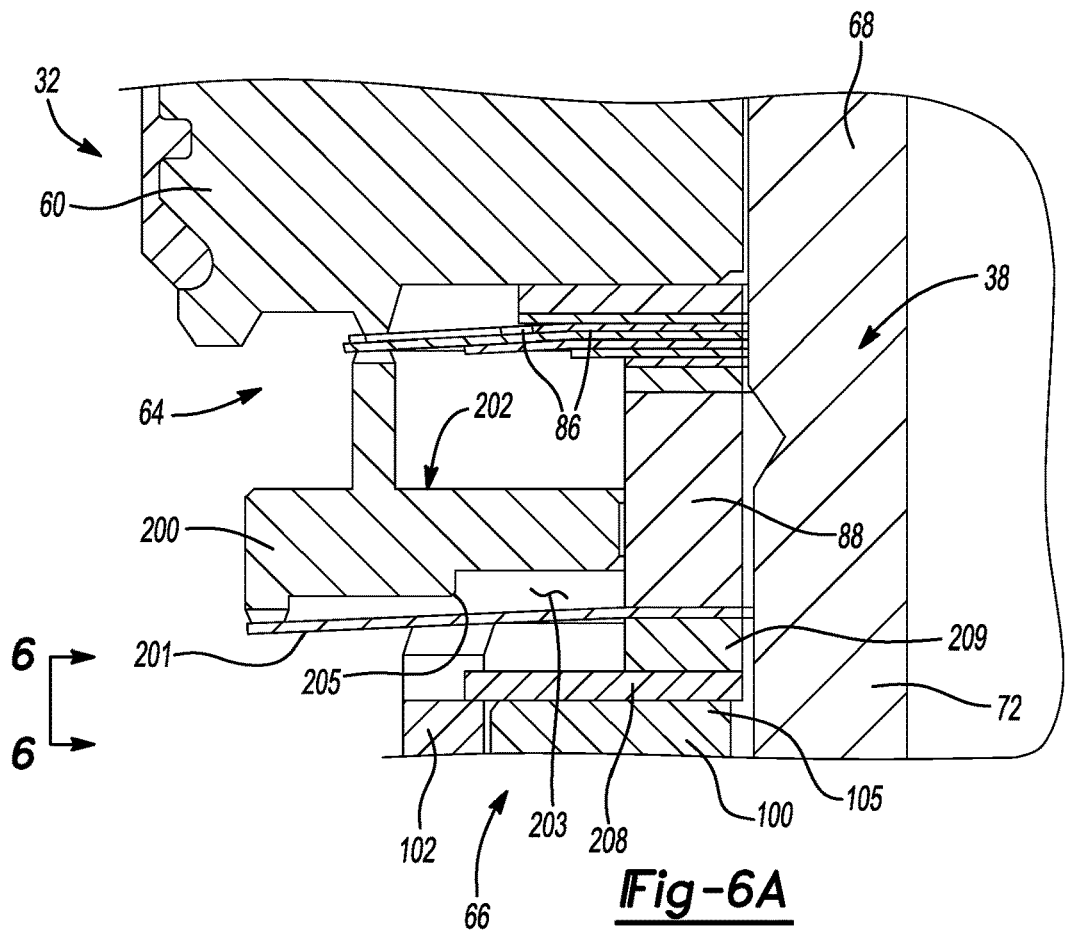
FIG. 6A is a fragmentary cross-sectional view of the shock absorber illustrated in FIG. 3 depicting the plunger sleeve in an engaged position.

The aperture 192 places the plunger chamber 190 in fluid communication with the first accumulation chamber 194. When the plunger chamber 190 is pressurized via the fluid flowing from the first accumulation chamber 194 into the plunger chamber 190 through the aperture 192, the plunger sleeve 102 is urged longitudinally towards the rebound valve assembly 64 from a rest position (FIG. 5) to an engaged position (FIG. 6A). In the engaged position (FIG. 6A), the plunger sleeve 102 applies an adaptive force to the rebound valve assembly 64. A magnitude of the adaptive force applied by plunger sleeve 102 to the rebound valve assembly 64 is based on the pressure within plunger chamber 190 and the effective surface area on an annular land 199 on the plunger sleeve 102 that extends between the reduced diameter portion 170 and the enlarged diameter portion 172 of the plunger sleeve 102. A surface area of the annular land 199 that is acted on by the pressurized fluid creates the adaptive force the plunger sleeve 102 applies to the rebound valve assembly 64. It should be appreciated that the effective area of the annular land 199 may be varied by changing the difference in diameter between the reduced diameter portion 170 and the enlarged diameter portion 172 of the plunger sleeve 102. Varying the surface area of the land 199 changes the adaptive force the plunger sleeve 102 applies to the rebound valve assembly 64.

In the illustrated embodiment, the rebound valve assembly 64 includes a floating support washer 200 and a compliant member 201. The floating support washer 200 extends annularly about and can slide longitudinally relative to sleeve 88. The floating support washer 200 is therefore longitudinally moveable relative to the piston body 60. As best seen in FIG. 4, the floating support washer 200 includes an engagement face 202, a floating support washer cavity 203 opposite the engagement face 202, and an outer rim 204. The engagement face 202 of the floating support washer 200 faces the plurality of rebound valve plates 86. The compliant member 201 is coupled to the piston rod 34 between the floating support washer 200 and the frequency dependent damper assembly 66. The compliant member 201 applies a biasing force to the floating support washer 200 that biases the floating support washer 200 towards the rebound valve assembly 64.

Although other configurations are possible, in the illustrated embodiment, the compliant member 201 is a disk spring that contacts the outer rim 204 of the floating support washer 200. When the plunger sleeve 102 is in the engaged position (FIG. 6A), the plunger sleeve 102 contacts the compliant member 201, transferring the adaptive force to the compliant member 201. The adaptive force that the plunger sleeve 102 transmits to the compliant member 201 functions to increase the biasing force that the compliant member 201 applies to the floating support washer 200. The floating support washer cavity 203 faces the compliant member 201 and is configured so that the compliant member 201 is at least partially received in the floating support washer cavity 203 when the plunger sleeve 102 contacts the compliant member 201 in the engaged position. In the illustrated example, the floating support washer 200 has an annular step 205 in the floating support washer cavity 203 that is sized to accommodate the flexing of the compliant member 201. It should be appreciated that the location and depth of the floating support washer cavity 203 and the annular step 205 are design parameters that can be changed to vary the magnitude of the biasing force and the adaptive force that are applied to the plurality of rebound valve plates 86. It should also be appreciated that alternative embodiments are possible where the floating support washer 200 and/or the compliant member 201 are eliminated. Where the compliant member 201 is eliminated, the plunger sleeve 102 contacts and directly applies the adaptive force to the floating support washer 200. When the floating support washer 200 is eliminated, the plunger sleeve 102 contacts and directly applies the adaptive force to the rebound valve plates 86 of the rebound valve assembly 64.

In the illustrated example, the floating support washer 200 supports the plurality of rebound valve plates 86 on an outer periphery. This ensures that a given amount of adaptive force generates a maximum amount of resistance to the rebound valve assembly 64 that opposes opening of the rebound valve assembly 64. The design of the plunger sleeve 102 includes a smaller effective area of the annular land 199, which in turn allows a smaller outer diameter of the enlarged diameter portion 172, which in turn affects packaging. Optimization of the components also allows a single design to be applied to multiple bores to reduce the manufacturing complexity.

It should be noted that the radial position of engagement face 202 may be varied to apply a force to different portions of plurality of rebound valve plates 86, thereby producing a different modification to the performance of the rebound valve assembly 64. To individually tune suspension characteristics to a particular vehicular application, it may be desirable to modify the system response and operation of the rebound valve assembly 64 based on vehicle type and configuration. Through the use of a number of different floating support washers 200 having an engagement face 202 positioned at different radial positions, a common damper housing 100 and plunger sleeve 102 may be employed throughout the family of shock absorbers 20, 26.

Another feature pertaining to the floating support washer 200 relates to its longitudinal translation degree of freedom, which allows the rebound valve assembly 64 to blow off. FIG. 5 depicts the plunger sleeve 102 in the rest position, where force is not applied to the rebound valve assembly 64. As shown in FIG. 6A, longitudinal movement of the plunger sleeve 102 towards the piston body 60 is limited by a plunger travel limiter 208 that is positioned longitudinally between the damper housing 100 and the rebound valve assembly 64. Although other configurations are possible, in the illustrated embodiment, a spacer 209 is positioned longitudinally between the plunger travel limiter 208 and the compliant member 201. The spacer 209 extends annularly about the reduced diameter section 68 of the piston rod 38. Accordingly, the compliant member 201 is clamped between the sleeve 88 and the spacer 209 and the plunger travel limiter 208 is clamped between the spacer 209 and the first end 105 of the damper housing 100 when the frequency dependent damper assembly 66 is threaded onto the threaded end 72 of the piston rod 34. The first end 111 of the plunger sleeve 102 contacts the plunger travel limiter 208 in the engaged position. Both the plunger travel limiter 208 and the compliant member 201 are made of resilient materials that can bend thereby providing a soft-stop for the plunger sleeve 102 as the plunger sleeve 102 approaches the engaged position. As shown in FIG. 3, the damper housing 100 may optionally include one or more steps 210 that contact the plunger sleeve 102 in the rest position to provide a hard-stop as the plunger sleeve 102 approaches the rest position.

The plunger travel limiter 208 contacts the plunger sleeve 102 when the plunger sleeve 102 is in the engaged position (FIG. 6A) to restrict the longitudinal movement of the plunger sleeve 102 towards the piston body 60. As a result, the plunger sleeve 102 limits the adaptive force that the plunger sleeve 102 applies to the compliant member 201, which is ultimately transmitted to the plurality of rebound valve plates 86 through the floating support washer 200 of the rebound valve assembly 64.

As best seen in FIG. 4, the plunger travel limiter 208 includes one or more tabs 211 that extend radially outwardly toward the pressure tube 30. The plunger sleeve 102 includes one or more notches 212 that are circumferentially aligned with the tabs 211 of the plunger travel limiter 208 such that the notches 212 in the plunger sleeve 102 receive the tabs 211 of the plunger travel limiter 208 as the plunger sleeve 102 moves longitudinally relative to the plunger travel limiter 208 between the rest position (FIG. 5) and the engaged position (FIG. 6A). Each notch 212 includes an inset surface 213 that contacts the tab 211 that is slidingly received therein when the plunger sleeve 102 is in the engaged position (FIG. 6A), thus preventing the plunger sleeve 102 from moving further towards the piston body 60. It should be appreciated that this arrangement could be reversed, where notches are provided in the plunger travel limiter 208 and tabs are provided on the plunger sleeve 102. It should also be appreciated that different protrusions or mechanical structures are possible other than the tab 211 and notch 212 arrangement described herein.

Figure 6B:
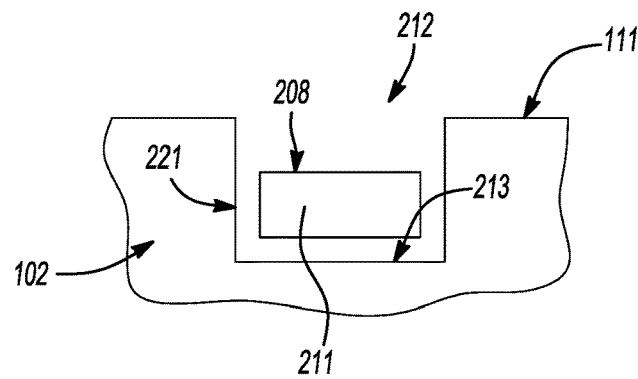
FIG. 6B is a partial side elevation view of an exemplary plunger sleeve and travel limiter of the shock absorber taken from line 6-6 in FIG. 6A.

For example, in the embodiment shown in FIG. 6B, the notches 212 in the plunger sleeve 102 extend linearly along the plunger sleeve 102 in a direction that is parallel to the longitudinal axis 35. As a result, the notches 212 have a rectangular profile 221 when viewed from the side. This configuration limits the longitudinal movement of the plunger sleeve 102 in one direction when the tab 211 of the plunger travel limiter 208 contacts the inset surface 213 of the notch 212 to stop the longitudinal movement of the plunger sleeve 102 towards the piston body 60. The point of contact between the tab 211 and the inset surface 213 of the notch 212 therefore defines the position of the plunger sleeve 102 in the engaged position.

Figure 6C:
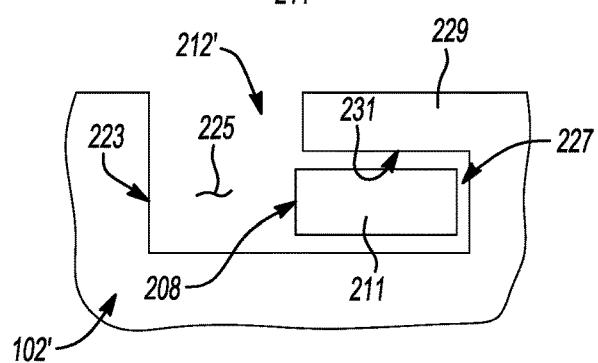
FIG. 6C is a partial side elevation view of another exemplary plunger sleeve and travel limiter of the shock absorber.

FIG. 6C illustrates an alternative embodiment where the notches 212' in the plunger sleeve 102' have a L-shaped profile 223. As a result, each notch 212' extends linearly along the plunger sleeve 102' in a direction that is parallel to the longitudinal axis 35 to define a longitudinal portion 225 of the notch 212' and circumferentially along the plunger sleeve 102' to define a circumferential portion 227 of the notch 212'. The plunger sleeve 102' has a hook portion 229 that extends over the circumferential portion 227 of the notch 212'. The hook portion 229 of the plunger sleeve 102' has an inside surface 231 that faces the circumferential portion 227 of the notch 212'. When the plunger sleeve 102' is installed, the tab 211 of the plunger travel limiter 208 is first received in the longitudinal portion 225 of the notch 212'. Then, the plunger sleeve 102' is rotated relative to the plunger travel limiter 208 to position the tab 211 in the circumferential portion 227 of the notch 212'. This configuration limits the longitudinal movement of the plunger sleeve 102' in two directions. Contact between the tab 211 of the plunger travel limiter 208 and the inset surface 213' of the notch 212' limits the distance the plunger sleeve 102 is permitted to move longitudinally towards the piston body 60. The point of contact between the tab 211 and the inset surface 213' of the notch 212' therefore defines the position of the plunger sleeve 102' in the engaged position. Contact between the tab 211 of the plunger travel limiter 208 and the inside surface 231 of the notch hook portion 229 of the plunger sleeve 102' limits the distance the plunger sleeve 102' is permitted to move longitudinally away from the piston body 60. The point of contact between the tab 211 and the inside surface 231 of the hook portion 229 therefore defines the position of the plunger sleeve 102' in the rest position. Because the plunger travel limiter 108 is made of a resilient material and can bend, this configuration provides soft-stops at both the engaged and rest positions of the plunger sleeve 102'. In both of the embodiments shown in FIGS. 6B and 6C, the notches 212, 212' are open to the first end 111 of the plunger sleeve 102, 102' such that they are configured to receive the tabs 211 of the plunger travel limiter 208 during assembly of the frequency dependent damper assembly 66.

Figure 7:
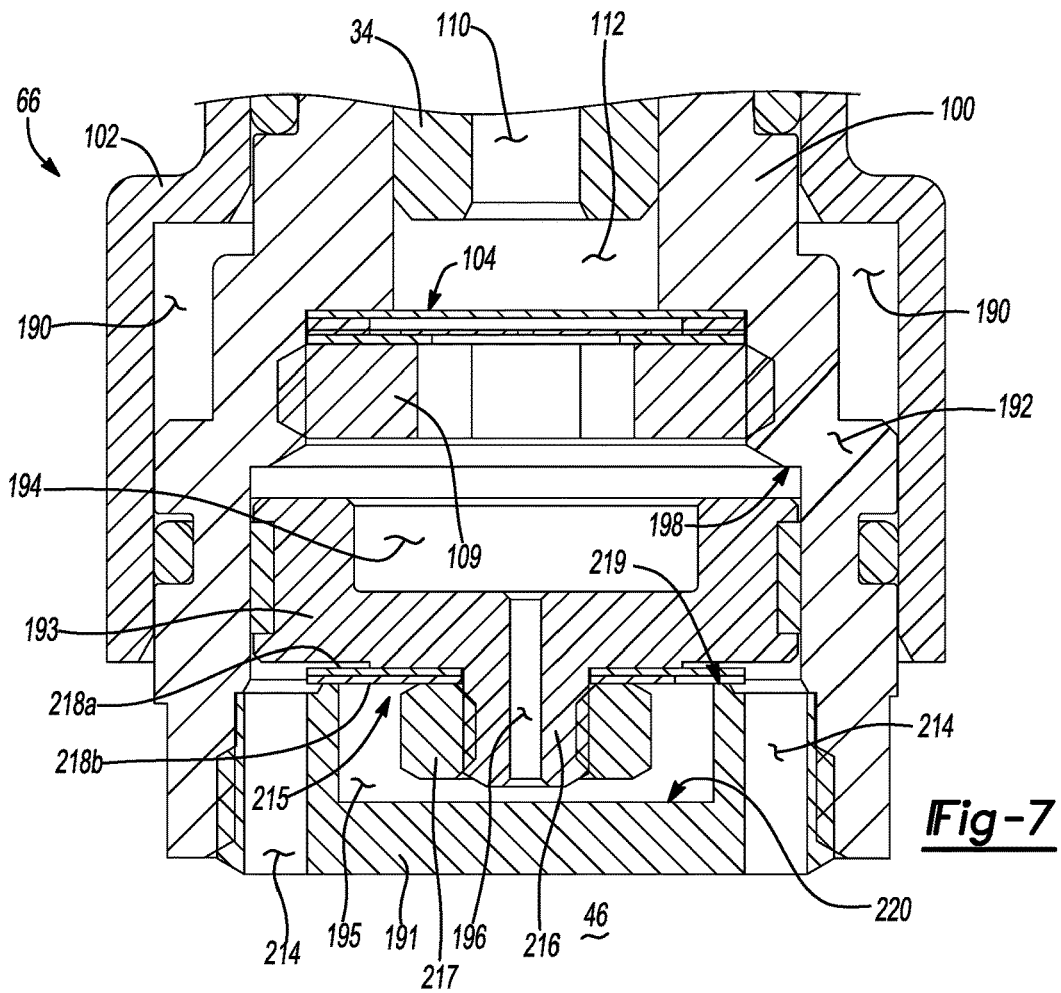
FIG. 7 is a fragmentary cross-sectional view depicting a frequency dependent damper assembly of the shock absorber.

As best seen in FIG. 7, the end plate 191 of the frequency dependent damper assembly 66 includes one or more channels 214 that are disposed in fluid communication with the second accumulation chamber 195 and the second working chamber 46. The frequency dependent damper assembly 66 also includes a floating valve assembly 215 (i.e., a second valve assembly) that is carried on the floating piston 193 such that the floating valve assembly 215 moves longitudinally with the floating piston 193 relative to the damper housing 100. Although other configurations are possible, in the illustrated embodiment, the floating valve assembly 215 is mounted on an extension portion 216 of the floating piston 193 that extends longitudinally from the floating piston 193 towards the end plate 191. A retainer 217 secures the floating valve assembly 215 to the extension portion 216 of the floating piston 193. By way of non-limiting example, the extension portion 216 of the floating piston 193 may be threaded and the retainer 217 may threadably engage the extension portion 216. The end plate 191 includes an end plate cavity 220 that defines the second accumulation chamber 195 together with the floating valve assembly 215. The end plate cavity 220 is spaced radially inward of the channels 214 in the end plate 191, which are radially positioned between the end plate cavity 220 and an outer perimeter of the end plate 191. The extension portion 216 of the floating piston 193 and the retainer 217 are at least partially received in the end plate cavity 220 when the floating piston 193 is in the seated position (FIG. 10A).

Figure 8A:
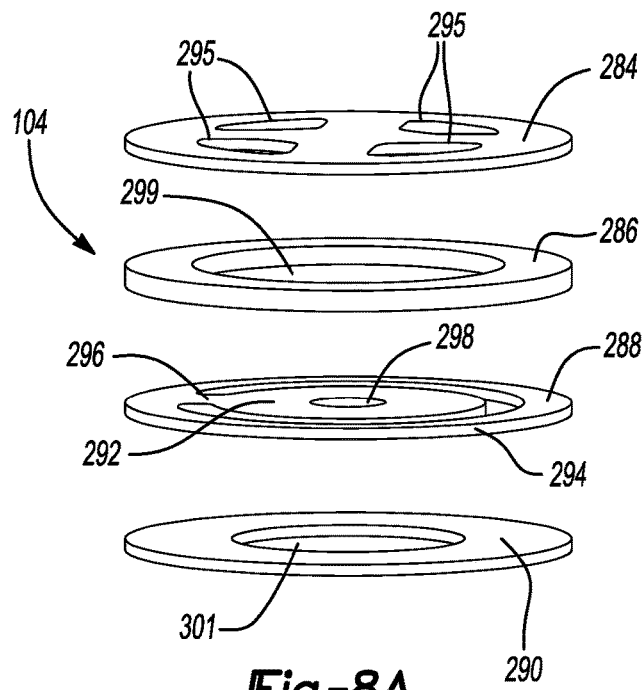
FIG. 8A is an exploded perspective view of an exemplary check valve of the frequency dependent damper assembly.

FIG. 8A illustrates the check valve 104, which includes a support disc 284, a spacer disc 286, a check disc 288, and a support disc 290. Each of the discs 284, 286, 288, 290 are positioned adjacent one another and are clamped against the damper housing 100 by the check valve support 109 (FIG. 3). Check disc 288 includes a moveable flap 292 that is connected to an outer ring 294 via a hinge 296. Deflection of flap 292 towards the first accumulation chamber 194 is restricted by the support disc 290. During a rebound stroke, fluid passes through apertures 295 of support disc 284 and fluid passes through an orifice 298 in the center of check disc 288. The check disc 288 is a spring steel disc such that the flap 292 may move relative to the outer ring 294 during a compression stroke. Spacer disc 286 includes an enlarged aperture 299 as compared to an aperture 301 of support disc 290. During a compression stroke, flap 292 is biased into aperture 299 to allow fluid flow from the first accumulation chamber 194 through the check valve 104, and into staging chamber 112. The thickness of the spacer disc 286 varies the travel of the flap 292 and therefore the flow area through the aperture 299. Accordingly, fluid flow is comparatively less restricted through the check valve 104 during a compression stroke and is comparatively more restricted through the check valve 104 during a rebound stroke.

Figure 8B:
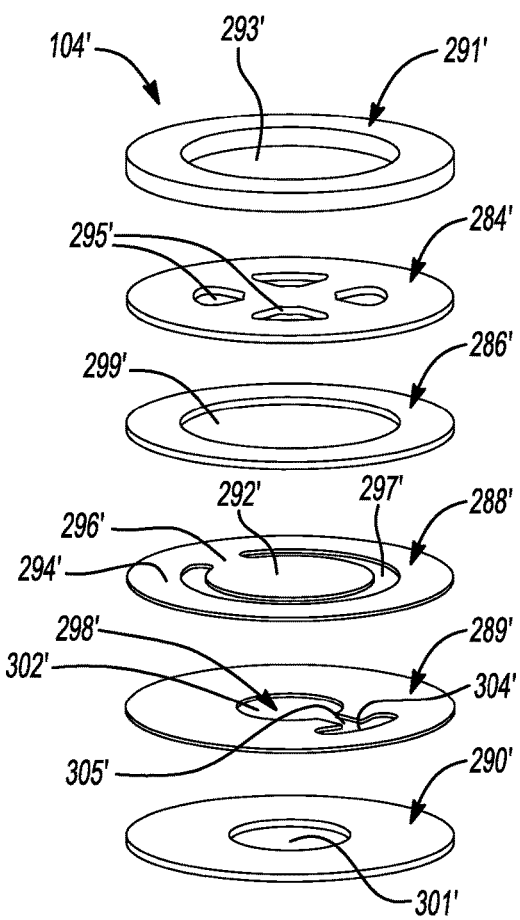
FIG. 8B is an exploded perspective view of another exemplary check valve of the frequency dependent damper assembly.

FIG. 8B illustrates an alternative design for a check valve 104', which includes a support disc 284', a spacer disc 286', a check disc 288', a bleed disc 289', a seat disc 290', and a gasket seal 291'. Each of the discs 284', 286', 288', 289', 290' are positioned adjacent one another and are clamped against the damper housing 100 by the check valve support 109 (FIG. 3). Gasket seal 291' is provided with opening 293'. Check disc 288' includes a moveable flap 292' that is connected to an outer ring 294' via a hinge 296'. Circumferential slot 297' extends around the flap 292' except where the hinge 296' connects the flap 292' to the outer ring 294'. As a result, the circumferential slot 297' has a C-like shape.

Deflection of flap 292' towards the staging chamber 112 is restricted by the support disc 284'. During a rebound stroke, fluid passes through the opening 293' in the gasket seal 291', through apertures 295' of support disc 284', through an enlarged aperture 299' in the spacer disc 286', and through the circumferential slot 297' in the check disc 288'. The orifice 298' in the bleed disc 289' includes a circular portion 302' that is centrally located in the bleed disc 289', a circumferential portion 304' that is aligned with the circumferential slot 297' in the check disc 288', and a passageway 305' that extends radially between the circular portion 302' and the circumferential portion 304' of the orifice 298'. The seat disc 290' overlaps with the circumferential portion 304' and passageway 305' and therefore blocks off longitudinal fluid flow through the circumferential portion 304' and passageway 305' of the orifice 298'. Thus, during a rebound stroke, fluid flow from the circumferential slot 297' in the check disc 288' enters the circumferential portion 304' and then flows radially inwardly through the passageway 305' in the bleed disc 289' to the circular portion 302' of the orifice 298' and then out of the check valve 104' through aperture 301' in the seat disc 290'. The circumferential portion 304' of the orifice 298' may be wider than the hinge 296' of the check disc 288' to prevent the hinge 296' from completely blocking the circumferential portion 304' of the orifice 298', even if the hinge 296' overlaps with part of the circumferential portion 304' of the orifice 298'. The check disc 288' is a spring steel disc such that the flap 292' may move relative to the outer ring 294' during a compression stroke. The enlarged aperture 299' of the spacer disc 286' is larger than the aperture 301' of seat disc 290'. During a compression stroke, flap 292' is biased into aperture 299' to allow fluid flow from the first accumulation chamber 194 through the check valve 104', and into staging chamber 112. More particularly, fluid flow passes through aperture 301' and orifice 298', past the deflected flap 292' (via the circumferential slot 297' in the check disc 288' and the enlarged aperture 299' in the spacer disc 286'), through the apertures 295' in the support disc 284', and out of the check valve 104' through the opening 293' in the gasket seal 291'. The thickness of the spacer disc 286' varies the travel of the flap 292' and therefore the flow area through the aperture 299'. Accordingly, fluid flow is comparatively less restricted through the check valve 104' during a compression stroke and is comparatively more restricted through the check valve 104' during a rebound stroke.

Figure 9:
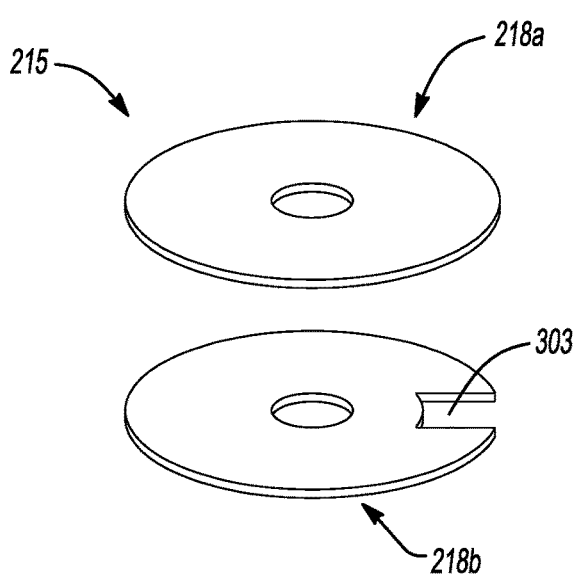
FIG. 9 is an exploded perspective view of a floating valve assembly of the frequency dependent damper assembly.

As best seen in FIGS. 7 and 9 the floating valve assembly 215 includes one or more valve plates 218a, 218b that are resilient and are positioned longitudinally between the floating piston 193 and the end plate 191. Plate 218b of the floating valve assembly 215 contacts a lip 219 of the end plate 191 when the floating piston is in the seated position (FIG. 10A) and plate 218b is longitudinally spaced away from the lip 219 of the end plate 191 when the floating piston 193 is in the unseated position (FIG. 10B). Plate 218b of the second valve assembly 215 includes one or more bleed ports 303 disposed around an outer periphery of the plate 218b. The bleed ports 303 are disposed in fluid communication with the channels 214 in the end plate 191. Accordingly, the bleed ports 303 allow fluid to bleed out of the second accumulation chamber 195 and into the channels 214 when plate 218b is abutting the end plate 191, which occurs when the floating piston 193 is in the seated position (FIG. 10A). Each bleed port 303 has a cross-sectional area that reduces a volumetric flow rate of the fluid flowing between the second accumulation chamber 195 and the channels 214 in the end plate 191 when the floating piston 193 is in the seated position (FIG. 10A) compared to the volumetric flow rate of the fluid flowing between the second accumulation chamber 195 and the channels 214 in the end plate 191 when the floating piston 193 is in the unseated position (FIG. 10B). By way of example and without limitation, each of the bleed ports 303 in plate 218b may have a cross-sectional area of 0.1 to 3.0 square millimeters ($mm^2$).

Operation of shock absorber 20 varies based on the direction and frequency of input forces. A low frequency rebound mode of operation will now be described. As shown in FIG. 3, during a rebound stroke, fluid in the first working chamber 44 is compressed and flows between the first working chamber 44 and the second working chamber 46 through rebound passage 76, overcoming the load required to deflect the rebound valve plates 86 of rebound valve assembly 64, such that fluid flows as depicted by arrow 92. As shown in FIG. 10A, fluid pressure within the first working chamber 44 also flows through passage 110 in the piston rod 34 and into the staging chamber 112. From the staging chamber 112, fluid passes through the check valve 104 and enters the first accumlation chamber 194. As a result, the pressure of the fluid in the first accumulation chamber 194, which is downstream of the check valve 104, will be lower compared to the pressure of the fluid in the staging chamber 112. The pressure of the fluid in the first accumulation chamber 194 holds the floating piston 193 in the seated position. Because the apertures 192 in the damper housing 100 fluidly connect the first accumulation chamber 194 and the plunger chamber 190, fluid flows from the first accumulation chamber 194 to the plunger chamber 190 along flow path F1 such that the pressure of the fluid in the first accumulation chamber 194 charges the plunger chamber 190 during low frequency rebound, forcing the plunger sleeve 102 towards the engaged position. The adaptive force of the plunger sleeve 102 is applied to the rebound valve plates 86 and creates an increased resistance to rebound valve assembly 64 that opposes opening of the rebound valve assembly 64 during low frequency rebound conditions. It should be appreciated that a certain amount of time is required for fluid to pass from staging chamber 112 to the first accumulation chamber 194 and the plunger chamber 190. This time delay in providing the controlled pressure build up in the first accumulation chamber 194 and the plunger chamber 190 through the check valve 104 provides frequency dependent damping.

FIG. 10A illustrates fluid flow through the frequency dependent damper assembly 66 when the shock absorber 20 is subject to low frequency rebound inputs. As shown in FIG. 10A, a first fluid flow path 400 is defined during the rebound stroke of the piston assembly 32 when fluid pressure in the first accumulation chamber 194 is greater than the fluid pressure in the second accumulation chamber 195 and the floating piston 193 is in the seated position. The first fluid flow path 400 extends from the first working chamber 44 and through the passage 110 in the piston rod 38. The fluid in the first fluid flow path 400 then flows through the check valve 104 and into the first accumulation chamber 194. From there, the fluid in the first fluid flow path 400 flows through the bleed channel 196 in the floating piston 193 and into the second accumulation chamber 195. The fluid in the first fluid flow path 400 then flows from the second accumulation chamber 195, through the bleed ports 303 in plate 218b of the floating valve assembly 215, through the channels 214 in the end plate 191, and out into the second working chamber 46.

With reference to FIG. 10B, as the damper goes into rebound during a high frequency input mode, fluid passes through the passage 110 in piston rod 34 into the staging chamber 112 and the first and second accumulation chambers 194, 195 at a higher volumetric flow rate. The higher volumetric flow rate of the fluid is restricted as the fluid flows through the bleed ports 303 in plate 218b, which causes an increase in pressure in the second accumulation chamber 195. This increase in pressure in the second accumulation chamber 195 moves the floating piston 193 to the unseated position (FIG. 10B), which allows the fluid to flow out of the first and second accumulation chambers 194, 195 at a higher volumetric flow rate compared to when the floating piston 193 is in the seated position (FIG. 10A). This creates a blow-off condition in the frequency dependent damper assembly 66, where pressure drops in the first and second accumulation chambers 194, 195 and in the plunger chamber 190 causing the plunger sleeve 102 to move to the rest position. In the rest postion, the plunger sleeve 102 does not apply an adaptive force to the rebound valve plates 86 and therefore the rebound valve assembly 64 provides less damping during high frequency rebound inputs.

Due to the nature of the high frequency rebound inputs, a piston rod stroke reversal occurs before the fluid has time to build pressure within the plunger chamber 190. This time requirement causes no additional load to be applied to the plunger sleeve 102. The pressure in the plunger chamber 190 that may drive movement of plunger sleeve 102 compared to the pressure within the first accumulation chamber 194 determines the magnitude of the adaptive force that the plunger sleeve 102 will generate. This in turn depends on the frequency of the input. At a higher frequency, there is insufficient time to charge the plunger chamber 190. At lower frequencies, fluid pressure builds in the plunger chamber 190 and acts on the land 199 of the plunger sleeve 102 to move the plunger sleeve 102 to the engaged position and generate the adaptive force. It should be noted that during a rebound stroke of either high or low frequency, the fluid flow path through the piston assembly 32 along arrows 82 remains the same (FIG. 3). The only change is the magnitude of the adaptive force on the rebound valve plates 86 to restrict opening of the rebound valve assembly 64.

FIG. 10B illustrates fluid flow through the frequency dependent damper assembly 66 when the shock absorber 20 is subject to high frequency rebound inputs. As shown in FIG. 10B, a second fluid flow path 402 is defined during a rebound stroke of the piston assembly 32 when fluid pressure in the first accumulation chamber 194 is less than or equal to the fluid pressure in the second accumulation chamber 195 and the floating piston 193 is in the unseated position. The second fluid flow path 402 extends from the first working chamber 44 and through the passage 110 in the piston rod 34. Fluid flowing in the second fluid flow path 402 flows through the check valve 104 and into the first accumulation chamber 194. Fluid flowing in the second fluid flow path 402 flows through the bleed channel 196 in the floating piston 193 from the first accumulation chamber 194 to the second accumulation chamber 195. Fluid flowing in the second fluid flow path 402 then flows between plate 218b of the second valve assembly 215 and the lip 219 of the end plate 191, through the channels 214 in the end plate 191, and out into the second working chamber 46. It should be appreciated that the volumetric flow rate of the fluid flowing through the first fluid flow path 400 (FIG. 10A) is less (i.e., more restricted) as compared to the fluid flowing through the second fluid flow path 402 (FIG. 10B).

As shock absorber 20 goes into jounce, or compression, pressure in the first working chamber 44 will be lower than the second working chamber 46. As shown in FIG. 3, during a compression stroke, fluid in the second working chamber 46 is compressed and flows between the second working chamber 46 and the first working chamber 44 through compression passage 74, overcoming the load required to deflect the compression valve plates 78 of compression valve assembly 62, such that fluid flows as depicted by arrows 82. At the same time, pressure in the second working chamber 46 and therefore the channels 214 in the end plate 191 forces the floating piston 193 to the unseated position, resetting the frequency dependent damper assembly 66 for the next cycle. With the floating piston 193 in the unseated position during a compression stroke, fluid flows from the second working chamber 46, through the channels 214 in the end plate 191, through the frequency dependent damper assembly 66, and into the first working chamber 44.

Figure 11:
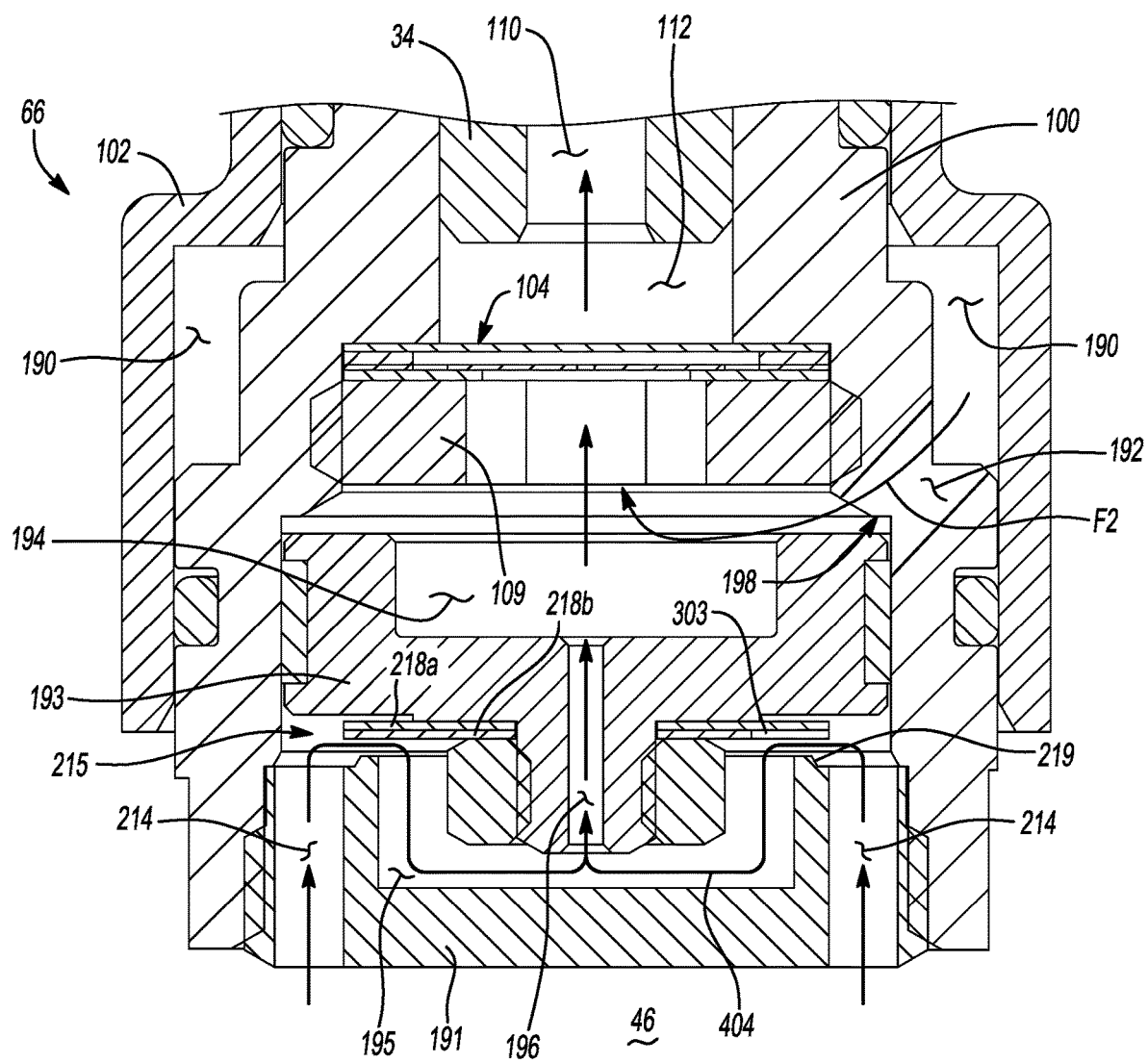
FIG. 11 is a fragmentary cross-sectional view of the shock absorber illustrated in FIG. 3 depicting the floating piston of the frequency dependent damper assembly during a compression stroke.
Figure 12:
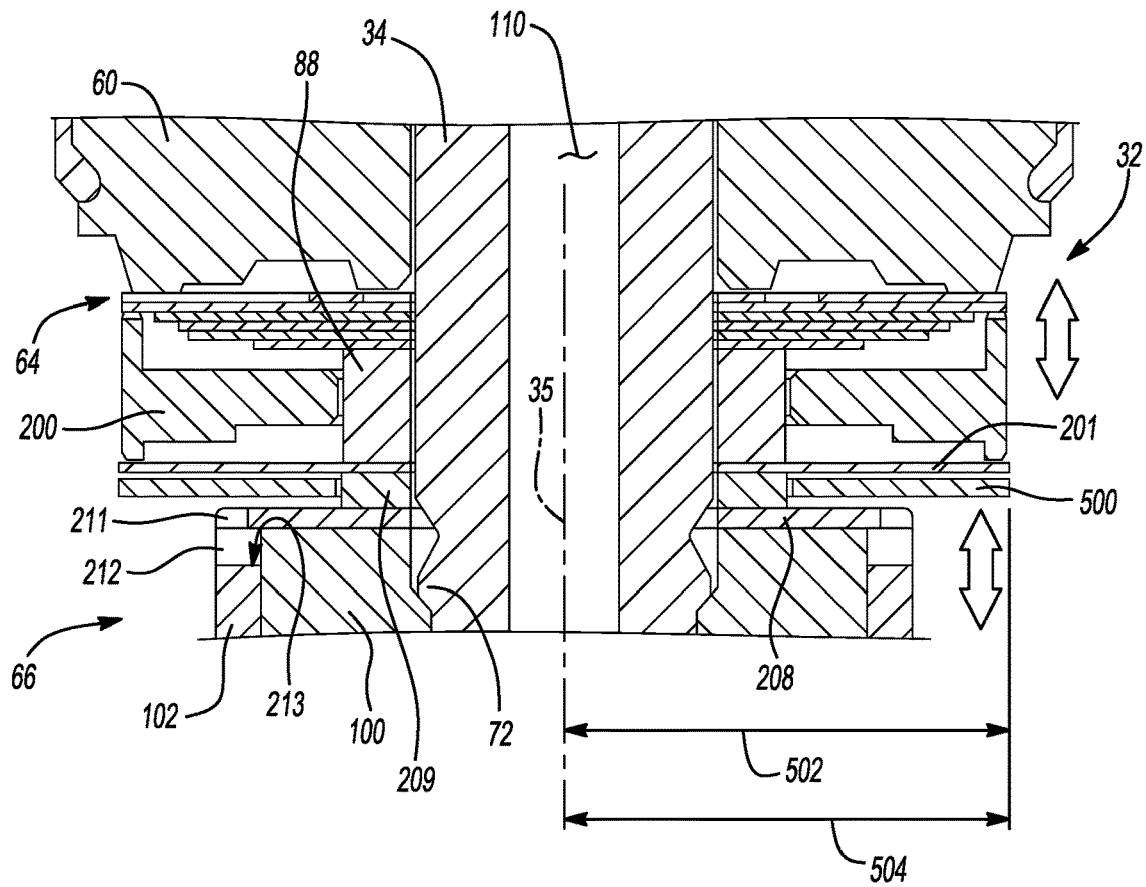
FIG. 12 is a fragmentary cross-sectional view of another shock absorber constructed in accordance with the teachings of the present disclosure where a floating disk has been added.

FIG. 11 illustrates fluid flow through the frequency dependent damper assembly 66 when the shock absorber 20 is subject to a compression stroke. During a compression stroke, fluid flows from the plunger chamber 190 to the first accumulation chamber 194 through the apertures 192 along flow path F2. A third fluid flow path 404 is also defined during the compression stroke of the piston assembly 32 when fluid pressure in the second accumulation chamber 195 is greater than the fluid pressure in the first accumulation chamber 194, which moves the floating piston 193 to the unseated position. The third fluid flow path 404 extends from the second working chamber 46 through the channels 214 in the end plate 191, between the lip 219 of end plate 191 and plate 218b of the floating valve assembly 215, and into the second accumulation chamber 195. Fluid flowing through the third fluid flow path 404 flows through the bleed channel 196 in the floating piston 193 from the second accumulation chamber 195 to the first accumulation chamber 194. Fluid in the third fluid flow path 404 then flows through the check valve 104, through the passage 110 in the piston rod 34, and out into the first working chamber 44.

During the compression stroke, pressure in first working chamber 44, passage 110, and staging chamber 112 is lower than the pressure in the first accumulation chamber 194, allowing fluid to flow from high pressure to low pressure through the check valve 104. Fluid pushes the check disc 288 against a spring force of the check valve 104 and a release of pressure within the first accumulation chamber 194 takes place. This allows the first accumulation chamber 194 to be depressurized.

A number of features of the shock absorber 20 may be varied to tune the operating characteristics exhibited during frequency dependent damping. For example, check valve 104 provides restriction for fluid flowing through the piston rod 34 to the first accumulation chamber 194. The orifice size and/or number of apertures through the check valve 104 is tunable and result in different frequency dependent damping. It should be appreciated that the check valve 104 may be shaped as desired and made of a number of different materials of varying flexibility. In the illustrated embodiments, the adaptive force of the plunger sleeve 102 is applied to the rebound valve assembly 64. However, it should be appreciated that the frequency dependent damper assembly 66 could be configured such that the adaptive force of the plunger sleeve 102 is applied to the compression valve assembly 62.

Figure 13:
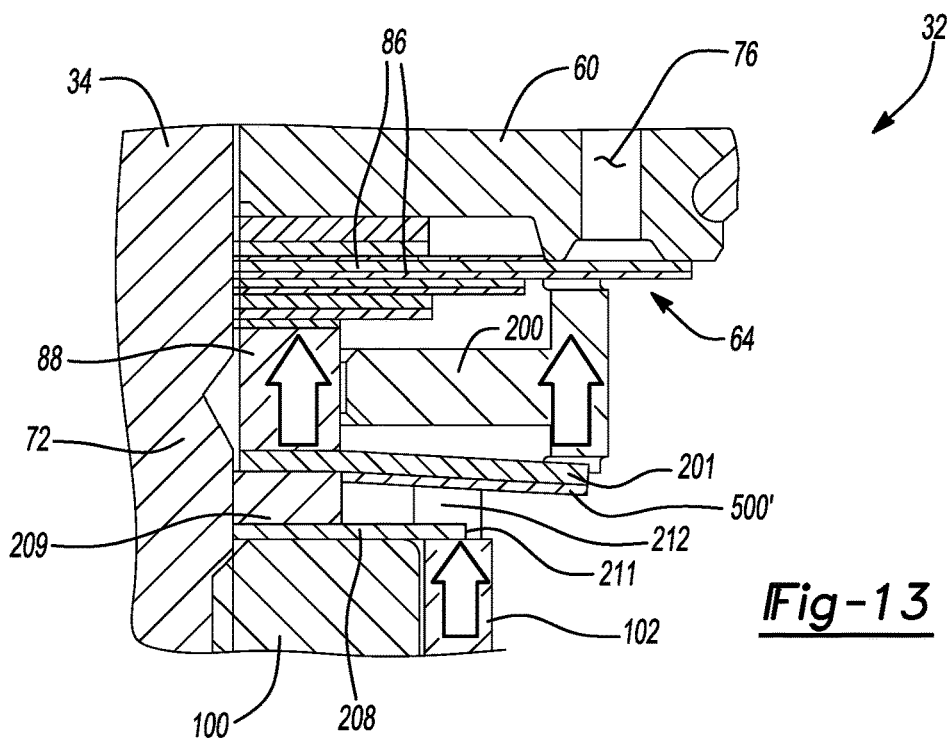
FIG. 13 is a fragmentary cross-sectional view of the shock absorber illustrated in FIG. 12 where the floating disk is thin.
Figure 14:
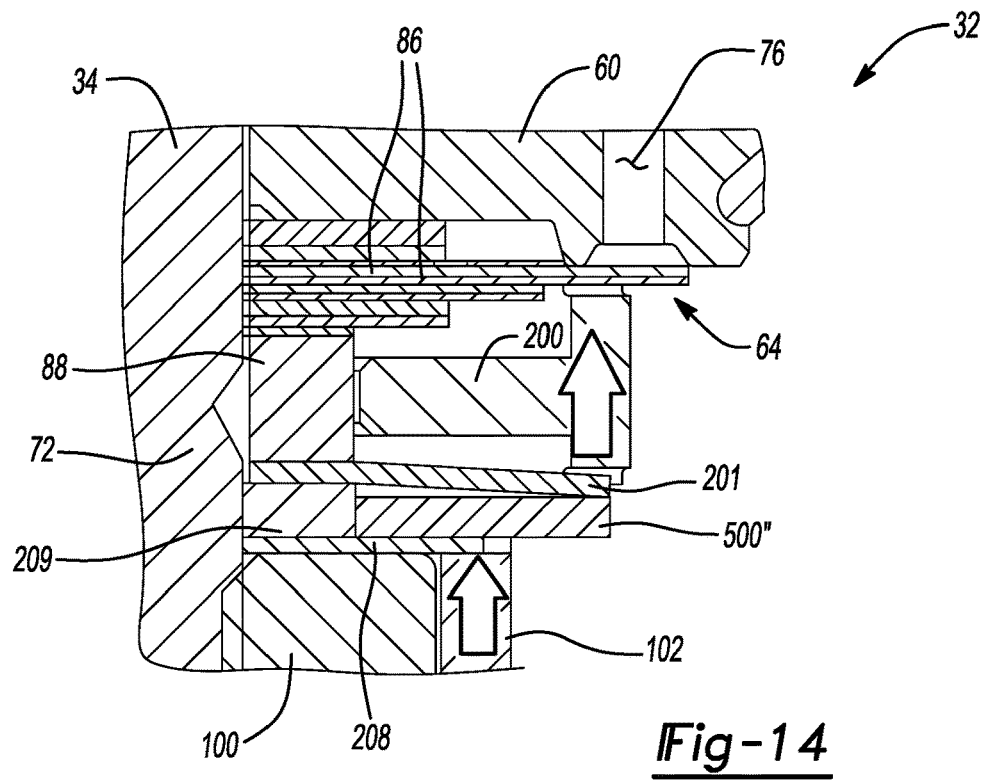
FIG. 14 is a fragmentary cross-sectional view of the shock absorber illustrated in FIG. 12 where the floating disk is thick.
Figure 15:
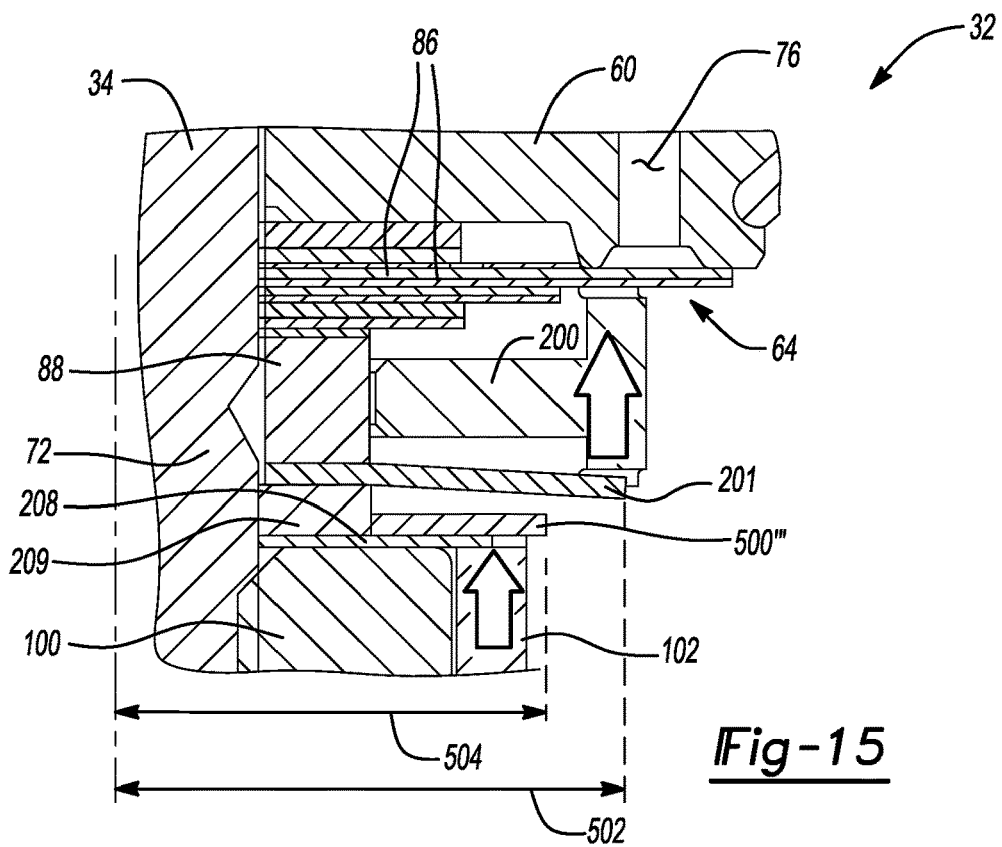
FIG. 15 is a fragmentary cross-sectional view of the shock absorber illustrated in FIG. 12 where the floating disk has a small diameter.

FIGS. 12-15 show alternative embodiments where a floating disk 500 extends annularly about spacer 209 at a position that is longitudinally between the compliant member 201 on one side and the plunger travel limiter 208 on the other. The floating disk 500 is longitudinally moveable relative to the spacer 209. The compliant member 201 has a compliant member radius 502 and the floating disk 500 has a floating disk radius 504 that may equal the compliant member radius 502. The plunger sleeve 102 contacts the floating disk 500 in these alternative embodiments instead of contacting the compliant member 201 directly. Accordingly, the floating disk 500 transmits the adaptive force from the plunger sleeve 102 to the compliant member 201. The design of the floating disk 500 can be varied to change the magnitude of the adaptive force that is applied to the compliant member 201. For example, a thickness of the floating disk 500 can be varied to increase or decrease the magnitude of the adaptive force applied to the compliant member. In FIG. 13, the thickness of the floating disk 500' has been decreased (i.e., the floating disk 500' is thinner), which results in the application of a lower magnitude adaptive force to the compliant member 201 without changing the design, size, or location of the plunger travel limiter 208 and the plunger sleeve 102. In FIG. 14, the thickness of the floating disk 500" has been increased (i.e., the floating disk 500" is thicker), which results in the application of a higher magnitude adaptive force to the compliant member 201 without changing the design, size, or location of the plunger travel limiter 208 and the plunger sleeve 102. In FIG. 15, the floating disk radius 504 of floating disk 500''' has been decreased and is therefore less than the compliant member radius 502, which results in the application of a lower magnitude adaptive force to the compliant member 201 without changing the design, size, or location of the plunger travel limiter 208 and the plunger sleeve 102.

Figure 16:
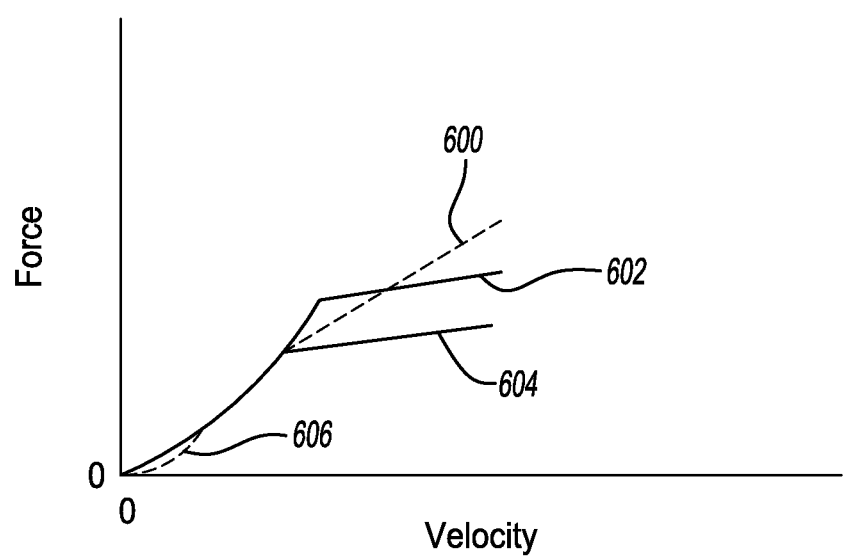
FIG. 16 is a graph of force versus velocity comparing several dampening curves of shock absorbers constructed in accordance with the teachings of the present disclosure.

FIG. 16 is a plot illustrating the frequency dependent damping of the frequency dependent damper assembly 66 during a rebound stroke. The vertical or y-axis of the plot represents the adaptive force the plunger sleeve 102 applies to the rebound valve assembly 64 in pounds (lbs) and the horizontal or x-axis of the plot represents the velocity of the piston rod 34 in meters per second (m/s). Dashed line 600 illustrates the relationship between force and velocity during a rebound stroke of a shock absorber 26 without the plunger travel limiter 208 disclosed herein. The force is high at higher velocities, which can create a lock-up condition where the rebound valve assembly 64 will not open and fluid will not flow from the first working chamber 44, through the rebound passage 76 in the piston assembly 32, into the second working chamber 46. Solid lines 602 and 604 illustrate the relationship between force and velocity during a rebound stroke of shock absorbers 26 that have the plunger travel limiter 208 disclosed herein. The adaptive force that the plunger sleeve 102 applies to the rebound valve assembly 64 is lower in the high velocity portion of the plot such that a lock-up condition does not occur. In the illustrated example, solid line 602 corresponds to the embodiment shown in FIG. 12 while solid line 604 corresponds to the embodiment shown in FIG. 13. The thinner floating disk 500' in the FIG. 13 embodiment results in less force applied to the rebound valve assembly 64. Dashed line 606 illustrates the frequency dependent damping effects of the frequency dependent damper assembly 66 disclosed herein, which includes the floating piston 193 and bleed channel 196. This design applies less force to the rebound valve assembly 64 during low velocity rebound inputs.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A damper system for a vehicle, comprising:
a pressure tube containing a hydraulic fluid;
a piston rod extending within the pressure tube along a longitudinal axis;
a piston assembly slidably fitted in the pressure tube for movement along the longitudinal axis, the piston assembly coupled to the piston rod and separating the pressure tube into a first working chamber and a second working chamber, the piston assembly including a piston body and a valve assembly that controls fluid flow between the first working chamber and the second working chamber;
a frequency dependent damper assembly including a damper housing coupled to the piston rod, a plunger sleeve that is longitudinally moveable relative to the damper housing along the longitudinal axis between a rest position and an engaged position, and a plunger chamber disposed between the damper housing and the plunger sleeve that is fluidly connected to at least one of the first working chamber and the second working chamber;
wherein an increase in pressure within the plunger chamber creates an adaptive force on the plunger sleeve that moves the plunger sleeve longitudinally towards the piston assembly to the engaged position, the plunger sleeve transmitting the adaptive force to the valve assembly when in the engaged position to increase resistance of the valve assembly to opening; and
a plunger travel limiter positioned longitudinally between the damper housing and the valve assembly, the plunger sleeve contacting and transmitting force through plunger travel limiter to the valve assembly when the plunger sleeve is in the engaged position, the plunger travel limiter restricting the longitudinal movement of the plunger sleeve towards the piston body and limiting the adaptive force the plunger sleeve applies to the valve assembly.

2. The damper system of claim 1, wherein the valve assembly includes a floating support washer slidably fitted on the piston rod for movement along the longitudinal axis, the floating support washer positioned longitudinally between the plunger travel limiter and the piston body.

3. The damper system of claim 2, wherein the valve assembly includes a compliant member coupled to the piston rod between the floating support washer and the plunger travel limiter, the compliant member positioned to apply a biasing force to the floating support washer that biases the floating support washer towards the piston body.

4. The damper system of claim 3, wherein the plunger sleeve contacts the compliant member in the engaged position to transmit the adaptive force to the compliant member and increase the biasing force the compliant member applies to the floating support washer.

5. The damper system of claim 4, wherein the compliant member is a disk spring and wherein the floating support washer includes an outer rim and a floating support washer cavity that is positioned radially between the piston rod and the outer rim, the floating support washer cavity positioned to at least partially receive the compliant member when the compliant member flexes as the floating support washer moves longitudinally along the longitudinal axis towards the damper housing.

6. The damper system of claim 5, wherein the floating support washer cavity includes at least one annular step that is positioned to accommodate the compliant member as the compliant member flexes in response to the plunger travel limiter moving longitudinally along the longitudinal axis to the engaged position.

7. The damper system of claim 3, wherein the piston body includes at least one flow passage that is disposed in fluid communication with the first and second working chambers and wherein the valve assembly includes at least one valve plate that is resilient and controls fluid flow through the at least one flow passage in the piston body by closing and opening the at least one flow passageway depending on fluid pressure in the first and second working chambers and the biasing force the compliant member applies to the floating support washer.

8. The damper system of claim 3, further comprising:
a floating disk slidably fitted on the piston rod for movement along the longitudinal axis, the floating disk positioned longitudinally between the plunger travel limiter and the compliant member.

9. The damper system of claim 8, wherein the compliant member has a compliant member radius and the floating disk has a floating disk radius that is less than the compliant member radius.

10. The damper system of claim 1, wherein the plunger travel limiter includes at least one tab that extends radially outwardly towards the pressure tube and the plunger sleeve includes at least one notch that is positioned to slidably receive the at least one tab of the plunger travel limiter as the plunger sleeve moves longitudinally relative to the plunger travel limiter along the longitudinal axis between the rest position and the engaged position.

11. The damper system of claim 10, wherein the at least one notch includes an inset surface that contacts the at least one tab of the plunger travel limiter when the plunger sleeve is in the engaged position preventing the plunger sleeve from moving further towards the piston body.

12. The damper system of claim 11, wherein the at least one notch has an L-shaped profile and includes a longitudinal portion and a circumferential portion and wherein the at least one tab of the plunger travel limiter is positioned in the circumferential portion of the at least one notch.

13. A damper system for a vehicle, comprising:
a pressure tube;
a piston assembly slidably fitted in the pressure tube that separates the pressure tube into a first working chamber and a second working chamber, the piston assembly including a piston body and a valve assembly that controls fluid flow between the first working chamber and the second working chamber;
a frequency dependent damper assembly including a damper housing coupled to the piston assembly, a plunger sleeve that circumferentially surrounds the damper housing is longitudinally moveable relative to the damper housing between a rest position and an engaged position, and a plunger chamber disposed between the damper housing and the plunger sleeve that is fluidly connected to at least one of the first working chamber and the second working chamber;
wherein an increase in pressure within the plunger chamber creates an adaptive force on the plunger sleeve that moves the plunger sleeve longitudinally towards the piston assembly to the engaged position, the plunger sleeve contacting the valve assembly in the engaged position to transmit the adaptive force to the valve assembly and increase resistance of the valve assembly to opening; and
a plunger travel limiter positioned longitudinally between the damper housing and the valve assembly that contacts the plunger sleeve when the plunger sleeve is in the engaged position to restrict the longitudinal movement of the plunger sleeve towards the piston body and limit the adaptive force the plunger sleeve applies to the valve assembly.

14. The damper system of claim 13, wherein the valve assembly includes a floating support washer positioned longitudinally between the plunger travel limiter and the piston body, the floating support being longitudinally moveable relative to the piston assembly and the plunger travel limiter.

15. The damper system of claim 14, wherein the valve assembly includes a compliant member that is positioned longitudinally between the floating support washer and the plunger travel limiter to apply a biasing force to the floating support washer, the biasing force biasing the floating support washer towards the piston body, the plunger sleeve contacting the compliant member in the engaged position to transmit the adaptive force to the compliant member and increase the biasing force the compliant member applies to the floating support washer.

16. The damper system of claim 13, wherein the plunger travel limiter includes at least one tab that extends radially outwardly towards the pressure tube and the plunger sleeve includes at least one notch that is positioned to slidably receive the at least one tab of the plunger travel limiter as the plunger sleeve moves longitudinally relative to the plunger travel limiter between the rest position and the engaged position.

17. The damper system of claim 16, wherein the at least one notch includes an inset surface that contacts the at least one tab of the plunger travel limiter when the plunger sleeve is in the engaged position preventing the plunger sleeve from moving further towards the piston body.

18. A frequency dependent damper assembly for attachment to a piston rod of a vehicle shock absorber having first and second working chambers, the frequency dependent damper assembly comprising:
a damper housing extending longitudinally between a first end and a second end;
a plunger sleeve mounted on or in the damper housing that is longitudinally moveable relative to the damper housing between a rest position and an engaged position;
a plunger chamber disposed between the damper housing and the plunger sleeve that is fluidly connected to at least one of the first working chamber and the second working chamber such that an increase in pressure within the plunger chamber creates an adaptive force on the plunger sleeve that moves the plunger sleeve longitudinally away from the second end of the damper housing to the engaged position; and
a plunger travel limiter, abutting the first end of the damper housing, that contacts the plunger sleeve when the plunger sleeve is in the engaged position to restrict longitudinal movement of the plunger sleeve relative to the damper housing, wherein the plunger travel limiter includes at least one tab that extends radially outwardly and the plunger sleeve includes at least one notch that is positioned to slidably receive the at least one tab of the plunger travel limiter as the plunger sleeve moves longitudinally relative to the plunger travel limiter between the rest position and the engaged position.

19. The damper system of claim 18, wherein the at least one notch includes an inset surface that contacts the at least one tab of the plunger travel limiter when the plunger sleeve is in the engaged position preventing the plunger sleeve from moving further away from the second end of the damper housing.

\* \* \* \* \*